United States Patent
Rakshe et al.

(10) Patent No.: US 12,327,284 B2
(45) Date of Patent: *Jun. 10, 2025

(54) SYSTEM FOR AUTOMATED DESCRIPTION AND CATEGORIZATION

(71) Applicant: HARTFORD FIRE INSURANCE COMPANY, Hartford, CT (US)

(72) Inventors: Anand Nagesh Rakshe, Avon, CT (US); Vannak Sin, Avon, CT (US); James Joseph Varney, Jr., Tolland, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/329,115

(22) Filed: Jun. 5, 2023

(65) Prior Publication Data

US 2023/0316415 A1     Oct. 5, 2023

Related U.S. Application Data

(63) Continuation of application No. 16/998,191, filed on Aug. 20, 2020, now Pat. No. 11,710,187, which is a
(Continued)

(51) Int. Cl.
*G06Q 40/00*       (2023.01)
*G06Q 10/0635*   (2023.01)
*G06Q 40/08*       (2012.01)

(52) U.S. Cl.
CPC ......... *G06Q 40/08* (2013.01); *G06Q 10/0635* (2013.01)

(58) Field of Classification Search
CPC ...................................................... G06Q 40/08
(Continued)

(56) References Cited

U.S. PATENT DOCUMENTS

| 10,310,699 B1* | 6/2019 | Jain ................... G06F 40/186 |
| 2013/0066656 A1* | 3/2013 | Hanson ............... G06Q 40/08 |
| | | 705/4 |
| 2014/0156313 A1* | 6/2014 | Rogers ............... G06Q 40/08 |
| | | 705/4 |

OTHER PUBLICATIONS

Authors: Lars Nonnemann et al.; Title: A Characterization of Data Exchange between Visual Analytics Tools; Publisher; IEEE; Date Added to IEEE Xplore: Mar. 11, 2021. (Year: 2021).*

(Continued)

*Primary Examiner* — Bruce I Ebersman
*Assistant Examiner* — Hatem M Ali
(74) *Attorney, Agent, or Firm* — Buckley, Maschoff & Talwalkar LLC

(57) ABSTRACT

A back-end application computer server may receive a request along with a descriptive term. A look-up process may be performed based on the descriptive term (and hidden terms) may establish a set of potential pre-determined descriptions. The user may select one of the potential descriptions, and a user identifier may be associated with the request. A series of dynamic information exchanges may then help assign a category to the user identifier. A partial set of initial request details may be received from a third-party device and the user may adjust and/or add details to create a complete set. A potential value may then be calculated for the request. An indication of the potential value may be transmitted to the user, and information about the user identifier may be transmitted to a user response terminal to facilitate communication between the user response terminal and the user.

13 Claims, 20 Drawing Sheets

Related U.S. Application Data continuation of application No. 15/479,427, filed on Apr. 5, 2017, now Pat. No. 10,796,370.

(58) Field of Classification Search
USPC .............................................................. 705/4
See application file for complete search history.

(56) References Cited

OTHER PUBLICATIONS

Authors: L. Stromback; Title: A Classification for Comparing Standardized XML Data; Publisher: IEE; Date Added to IEEE Xplore: Oct. 16, 2006. (Year: 2006).*

* cited by examiner

FIG. 7

RISK RELATIONSHIP SYSTEM – INSURANCE PREMIUM QUOTE

RISK RELATIONSHIP SYSTEM - INSURANCE PREMIUM QUOTE

Personalized Quote:

Estimated Annual Amount: $2,000.00
Property and Liability (BOP): $1,000.00 ~1120
Workers' Compensation: $1,000.00 ~1130

REQUEST A CALL FROM A SALES REPRESENTATIVE ~1110

Property Highlights  [EDIT] 1140
Business Personal Property Limit: $75,000.00
Personal Property of Others Limit: $75,000.00

Liability Highlights  [EDIT] 1150
Liability Limit Each Occurrence: $500,000.00
Liability Limit Aggregate: $1,000,000.00

Frequently Added Optional Coverages  1170
[ADD OR MODIFY OPTIONAL COVERAGES]

Workers' Compensation Highlights  [EDIT] 1160
Bodily Injury By Accident: $100,000.00
Bodily Injury By Disease: $500,000.00

FIG. 11

SYSTEM FOR AUTOMATED DESCRIPTION AND CATEGORIZATION

CROSS-REFERENCE TO RELATED APPLICATIONS

The present application is a continuation of U.S. patent application Ser. No. 16/998,191 entitled "SYSTEM FOR AUTOMATED DESCRIPTION AND CATEGORIZATION" and filed Aug. 20, 2020, which is a continuation of U.S. patent application Ser. No. 15/479,427 entitled "SYSTEM FOR AUTOMATED DESCRIPTION AND CATEGORIZATION" and filed Apr. 5, 2017. The entire content of these applications is incorporated herein by reference.

BACKGROUND

In some cases, a user might be potentially interested in entering into a risk relationship with an enterprise. For example, a business might be potentially interested in purchasing insurance from an insurer (e.g., to help spread risks associated with property damage, worker injuries, etc.). When exploring such a potential relationship, the business typically provides various types of information to the insurer (e.g., what type of business it is, how long the business has existed, how many employees work for the business, etc.) and receives an insurance quote, including an estimated insurance premium value, from the insurer. The business can then decide whether or not it will purchase an insurance policy from the insurer.

Often, a business will interact with an insurance agent to provide details about the business to the insurer. The insurance agent will typically have a substantial amount of experience with respect to collecting information about a business. For example, an insurance agent may be able to quickly assign a correct industry code to the business. It can be difficult, however, for a business to directly provide this type of information to an insurer. That is, because the business does not usually interact with insurance companies, determining an appropriate industry code for the business can be a confusing, time consuming, and error prone process. As a result, the ability to have a business interact directly with an insurer may be substantially limited.

It would therefore be desirable to provide systems and methods to automatically facilitate an exchange of risk relationship information directly between a user and an enterprise in an automated, efficient, and accurate manner.

SUMMARY OF THE INVENTION

According to some embodiments, systems, methods, apparatus, computer program code and means to facilitate an exchange of risk relationship information directly between a user and an enterprise in an automated, efficient, and accurate manner. In some embodiments, a back-end application computer server may receive a potential risk relationship request along with a descriptive term. A look-up process may be performed based on the descriptive term (and hidden terms) may establish a set of potential pre-determined descriptions. The user may select one of the potential descriptions, and a user identifier may be associated with the request. A series of dynamic information exchanges may then help assign a category to the user identifier. A partial set of initial request details may be received from a third-party device and the user may adjust and/or add details to create a complete set. A potential value may then be calculated for the potential risk relationship. An indication of the potential value may be transmitted to the user, and information about the user identifier may be transmitted to a user response terminal to facilitate communication between the user response terminal and the user.

Some embodiments comprise: means for receiving at a back-end application computer server, directly from a remote front-end user device associated with the user via a communication interface, a potential risk relationship request, wherein the communication interface facilitates an exchange of electronic messages, including messages exchanged via a distributed communication network; means for receiving at least one descriptive term from the front-end user device via an interactive user interface display; means for performing a look-up process based on the at least one descriptive term to establish a set of potential pre-determined descriptions, wherein the look-up process associates hidden descriptive terms with at least some of the potential pre-determined descriptions based on electronic records in a description data store, the description data store including a plurality of electronic records each associating a descriptive term with at least one hidden term and a potential pre-determined description; means for transmitting an indication of the set of potential pre-determined descriptions from the back-end application computer server to the front-end user device via the communication network; means receiving, from the front-end user device via the interactive user interface display, a selected description from the set of potential pre-determined descriptions; means for associating a user identifier with the potential risk relationship request; means for automatically assigning, via a series of dynamic information exchanges retrieved based on the selected description and electronic data records in a categorization data store, one of a number of pre-determined categories as being associated with the user identifier, wherein the categorization data store includes a plurality of electronic records each associating a description with a dynamic information exchange and at least one pre-determined category; means for receiving, from a third-party device based on the selected description, the user identifier, or the assigned category, a partial set of initial request details; means for receiving, from the front-end user device, adjustments to the partial set of initial request details along with additional initial request details to establish a complete set of request details; means for automatically calculating, based on the selected description, the assigned category, the complete set of request details, and information from an enterprise platform associated with the enterprise, a potential value associated with the potential risk relationship; means for transmitting an indication of the automatically calculated potential value directly from the back-end application computer server to the front-end user device via the communication network; and means for automatically transmitting information about the user identifier to a user response terminal, associated with the enterprise, to facilitate communication between the user response terminal and the user.

In some embodiments, a communication interface associated with a back-end application computer server exchanges information with remote front-end user devices. The information may be exchanged, for example, via public and/or proprietary communication networks.

Technical effects of some embodiments of the invention are improved and computerized ways to facilitate an exchange of risk relationship information directly between a user and an enterprise in an automated, efficient, and accurate manner. With these and other advantages and features that will become hereinafter apparent, a more complete

BRIEF DESCRIPTION OF THE DRAWINGS

FIG. 7 is a business details display in accordance with some embodiments.

FIG. 11 is an insurance premium quote display in accordance with some embodiments.

DETAILED DESCRIPTION

The present invention provides significant technical improvements to facilitate electronic messaging and dynamic data processing. The present invention is directed to more than merely a computer implementation of a routine or conventional activity previously known in the industry as it significantly advances the technical efficiency, access, and/or accuracy of communications between devices by implementing a specific new method and system as defined herein. The present invention is a specific advancement in the area of information processing by providing benefits in data accuracy, data availability, and data integrity and such advances are not merely a longstanding commercial practice. The present invention provides improvement beyond a mere generic computer implementation as it involves the processing and conversion of significant amounts of data in a new beneficial manner as well as the interaction of a variety of specialized client and/or third party systems, networks, and subsystems. For example, in the present invention may directly exchange information with an enterprise in an automated and efficient manner, thus improving the overall performance of the system associated with an enterprise (e.g., by reducing the amount of communication required between parties and reducing errors). Moreover, embodiments associated with automatic description and categorization processes might further improve communication network performance, user interactions (e.g., by increasing the accuracy of automatically calculated potential values), etc. Moreover, embodiments may improve user communications for an enterprise by coordinating messages from a user response terminal to a remote front-end user device (e.g., by automatically supplying a correct communication address to the user response terminal).

A user may be interested in establishing a risk relationship with an enterprise. For example, a business might want to purchase property and liability insurance, workers' compensation insurance, etc. from an insurer. When deciding whether or not to enter into such a relationship, the business will typically provide information describing the business to the insurer and receive an insurance quote, including an estimated insurance premium value, from the insurer. Often, the business will interact with an insurance agent (who has substantial experience collecting information about businesses) to provide these details to the insurer. Note that it may be difficult for a business to directly provide this type of information to an insurer (e.g., because the business does not usually interact with insurance companies). As a result, the ability to have a business interact directly with an insurer may be substantially limited.

Figure 1:
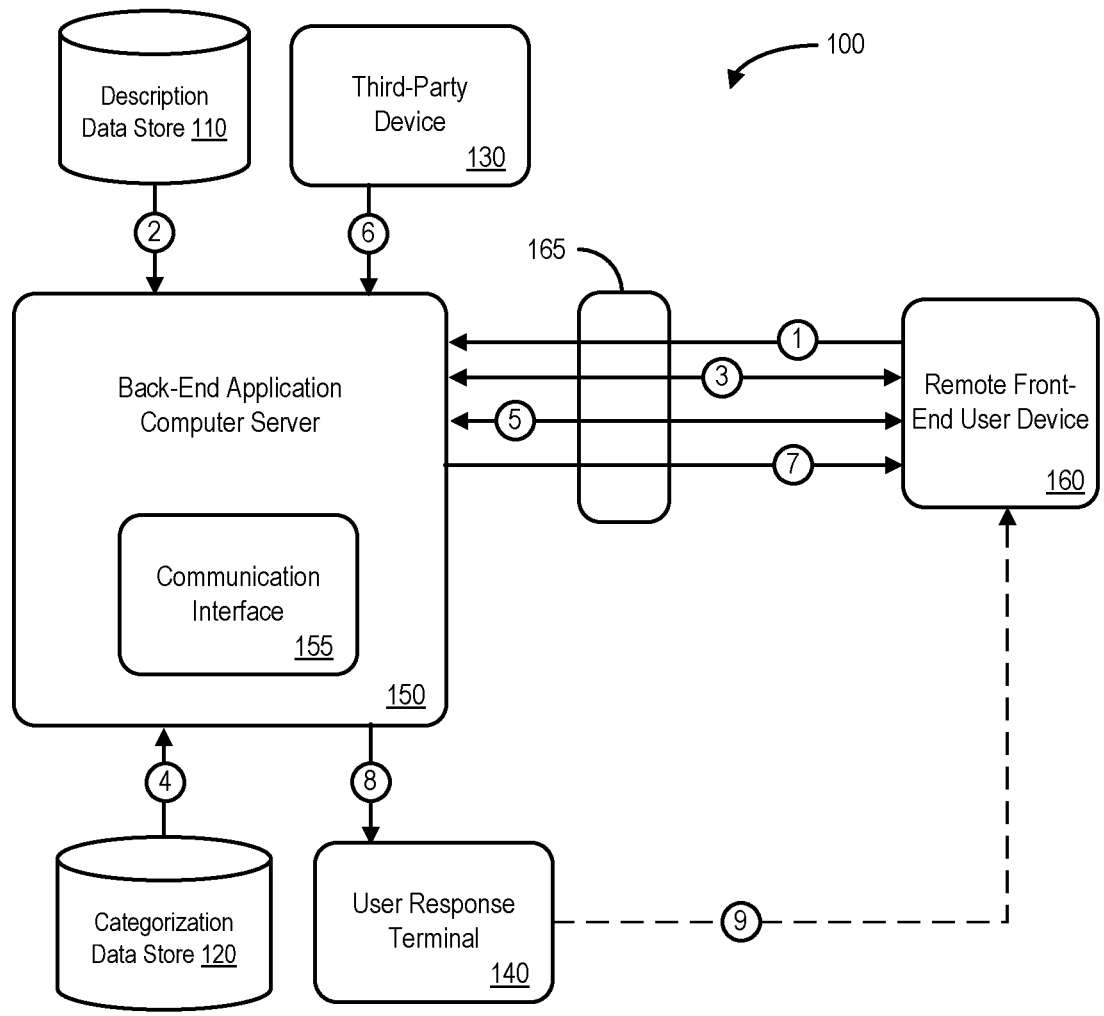
FIG. 1 is a high-level block diagram of a system according to some embodiments.

It would therefore be desirable to provide systems and methods to facilitate an exchange of risk relationship information directly between a user and an enterprise in an automated, efficient, and accurate manner. FIG. 1 is a high-level block diagram of a system 100 according to some embodiments of the present invention. In particular, the system 100 includes a back-end application computer server 150 that may access information in a description data store 110 (e.g., storing a set of electronic records including keywords, hidden terms, industry codes, etc.). The back-end application computer server 150 may also exchange information with remote front-end user devices 160 (e.g., via a firewall 165). According to some embodiments, a communication interface 155 of the back-end application computer server 150 may communicate with the front-end user devices 160, access information in the description data store 110, and facilitate the presentation of interactive user interface displays to a user. Note that the back-end application computer server 150 might also be associated with a third party, such as a vendor that performs a service for an enterprise.

The back-end application computer server 150 might be, for example, associated with a Personal Computer ("PC"), laptop computer, smartphone, an enterprise server, a server farm, and/or a database or similar storage devices. According to some embodiments, an "automated" back-end application computer server 150 may automatically facilitate the presentation of interactive user interface displays. As used herein, the term "automated" may refer to, for example, actions that can be performed with little (or no) intervention by a human.

As used herein, devices, including those associated with the back-end application computer server 150 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The back-end application computer server 150 may store information into and/or retrieve information from the description data store 110 and/or a categorization data store 120. The categorization data store 120 might, for example, store electronic records including information about series of dynamic information exchanges, question trees, etc. The description data store 110 may contain data that was downloaded and/or that was originally input by employees of an enterprise. The description data store 110 may be locally stored or reside remote from the back-end application computer server 150. As will be described further below, the description data store 110 may be used by the back-end application computer server 150 to automatically exchange information with a user. Although a single back-end application computer server 150 is shown in FIG. 1, any number of such devices may be included. Moreover, various devices described herein might be combined according to embodiments of the present invention. For example, in some embodiments, the back-end application computer server 150, description data store 110, and/or categorization data store 120 might be co-located and/or may comprise a single apparatus.

According to some embodiments, the system 100 may automatically facilitate an exchange of information via interactive user interface displays. For example, at (1) a front-end user device 160, associated with a user, might transmit a potential risk relationship request to the back-end application computer server 150 (e.g., via the communication interface 155). The back-end application computer server 150 may then use information from the description data store at (2) to exchange information with the remote front end user device 160 at (3) to determine an appropriate description of the business (e.g., an appropriate industry code) The back-end application computer server 150 may also use information from the categorization data store at (4) to exchange information with the remote front end user device 160 at (5) to assign an appropriate category to the user (e.g., via series of dynamic information exchanges).

The back-end application computer server 150 may then receive a partial set of initial request details from a third party device 130 at (6). This information might, for example, be used to "pre-populate" information fields in an interactive user interface display. The user may then adjust and/or complete the request details and a potential value (e.g., an estimated insurance premium quote) may be automatically calculated and transmitted to the front-end user device 160 at (7). According to some embodiments, the back-end application computer server 150 may also transmit information to a user response terminal 140 at (8). For example, a user's telephone number might be transmitted to the user response terminal 140 to facilitate a telephone call to the user at (9) to discuss the insurance quote in more detail.

Figure 2:
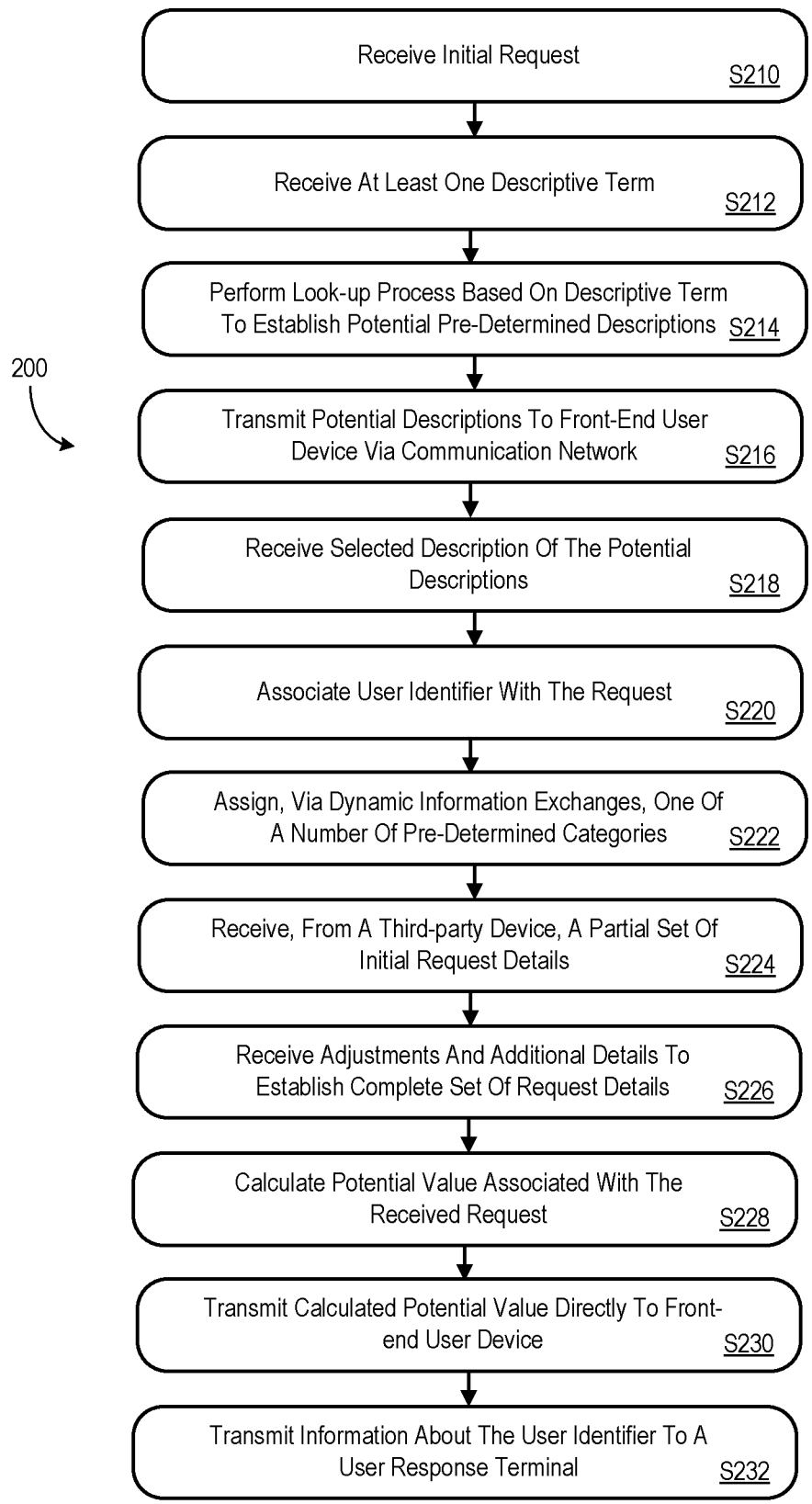
FIG. 2 illustrates a method according to some embodiments of the present invention.

Thus, some embodiments may facilitate an exchange of risk relationship information directly between a user and an enterprise in an automated, efficient, and accurate manner. Note that the system 100 of FIG. 1 is provided only as an example, and embodiments may be associated with additional elements or components. According to some embodiments, the elements of the system 100 automatically support interactive user interface displays over a distributed communication network. For example, FIG. 2 illustrates a method 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a back-end application computer server may receive, directly from a remote front-end user device associated with the user (e.g., a PC, a tablet computer, a smartphone, a television device, a gaming device, a smartwatch, etc.), an initial request. According to some embodiments, the back-end application computer server is adapted to communicate with different types of front-end user devices. In this case, information displayed on the interactive user interface display may be presented based on the type of device. For example, an amount of information, a font, a page layout, etc. might be dynamically modified to support different types of devices.

Note that some embodiments may incorporate a number of components and sub-systems that have been modularized in order to support the long term maintainability of the system. For example, the system might include three primary layers: a User Interface (UI); a middle service layer; and backend/downstream services. The UI layer might be built, for example, using a responsive design in which the same client-side code is delivered regardless of the device used to access the application (i.e. desktop, tablet or phone). The client device may then utilize the appropriate Cascading Style Sheets ("CSS"), images, and/or JavaScript in order to render the optimal presentation of the application for that particular device. The UI may incorporate several open source frameworks, including AngularJS, and utilize a single-page application design. Interactions with the middle service layer may be accomplished using Representational State Transfer ("REST") based service interactions and make use of and/or JavaScript Object Notation ("JSON") as the primary request payload structure.

The middle service layer may provide an HTTP interface into several different sub-systems and capabilities to support the features that are made available through the UI. This layer may transform the JSON/REST interface to support interactions that allow the system to retrieve dynamic and third party data, persist the user's progress, and/or provide an unbound commercial lines insurance quote to the end user. The layer may also let system administrators make content and/or business rule changes without impacting consumers that may be in the system simultaneously.

An engine, such as a blaze rules engine, may be leveraged to drive product, coverage optionality, and/or small business owner specific questions wording display rules on the UI. According to some embodiments, Business Process Execution Language ("BPEL") orchestrations may be leveraged to retrieve workers' compensation and other quotes and present them in a unified format. Moreover, leads tracking and generation may be integrated with a Customer Relationship Management ("CRM") application (e.g., SalesForce®). According to some embodiments, bridging capabilities and a prefill of information into another system may be provided, A/B testing may be supported, and/or the system may have the ability to retrieve a quote and transmit it (e.g., via an email message) later (e.g., in case backend systems are down).

At S212, at least one descriptive term may be received from the front-end user device via an interactive user interface display. For example, the user might enter text into an input field. At S214, the system may perform a look-up process based on received descriptive term to establish a set of potential pre-determined descriptions. According to some embodiments, the look-up process associates hidden descriptive terms with at least some of the potential pre-determined descriptions based on electronic records in a description data store. For example, the description data store might include a plurality of electronic records each associating a descriptive term with at least one hidden term and a potential pre-determined description. At S216, an indication of the set of potential pre-determined descriptions may be transmitted from the back-end application computer server to the front-end user device via a communication network. At S218, the system may receive, from the front-end user device via the interactive user interface display, a selected description from the set of potential pre-determined descriptions.

According to some embodiments, the selected description is associated with an industry code, such as a Standard Industrial Classification ("SIC") industry code. An SIC code is a four-digit numerical code assigned by the U.S. government to major businesses and industries. SIC codes are assigned based on common characteristics shared by the products, services, production, and/or delivery systems of a business. According to some embodiments, the selected description is associated with a North American Industry Classification System ("NAICS") code. An NAICS code is a six-digit numerical code used to classify a business. The code organizes establishments into industries according to the similarity in the processes used to produce goods or services. The first two digits designate the largest business sector, the third digit designates the subsector, the fourth digit designates the industry group, the fifth digit designates the particular industries, and the sixth digit designates national industries.

At S220, a user identifier is associated with the request. The user identifier might be associated with, for example, a user name, an email address, an Internet protocol address, a telephone number, and/or a postal address. According to some embodiments, the user identifier may be used to communicate with a user and/or to save a partially completed request for the user (e.g., so that the request might be retrieved and completed at another time).

At S222, the system may automatically assign, via a series of dynamic information exchanges retrieved based on the selected description and electronic data records in a categorization data store, one of a number of pre-determined categories (e.g., a building type associated with fire safety) as being associated with the user identifier. The categorization data store may include, for example, a plurality of electronic records each associating a description with a dynamic information exchange and at least one pre-determined category. By way of example, information in the categorization data store might define a "question tree," information wizard, or any series of information exchanges that can be used to automatically help a business determine an appropriate classification.

At S224, the system may receive, from a third-party device (e.g., based on the selected description, the user identifier, and/or the assigned category), a partial set of initial request details. For example, the third-party device might be associated with a Customer Relationship Management ("CRM") platform, a governmental platform (e.g., associated with a Department of Motor Vehicles), a real estate platform, a credit score platform, etc.). As another example, information from search platforms, advertisement systems, data stored locally at the front-end user device, and/or social media sites might be used to pre-populate some information for the user. According to some embodiments, information from the third-party device is also used to validate data received from the user (e.g., to make sure that a street address is correct).

At S226, the system may receive, from the front-end user device, adjustments to the partial set of initial request details along with additional initial request details to establish a complete set of request details. Types of information that might be in the complete set of request details include a number of business locations, a number of employees, a business ZIP code, an indication of one or more types of insurance, a time period (e.g., a policy start and/or end date), a business location, contact information, a legal entity type (e.g., a corporation, sole proprietorship, etc.), an indication of when a business was established, an office type, an estimated annual sales or gross revenue value, an online sales estimate, a number of property losses, a business personal property limit, a personal property of others limit, a number of liability losses, a general liability limit, building information, workers' compensation insurance data, and/or optional coverage selections.

At S228, the system may automatically calculate (e.g., based on the selected description, the assigned category, the complete set of request details, and information from an enterprise platform associated with the enterprise) a potential value associated with the request. For example, information from an underwriting platform associated with an insurer might be used to estimate an insurance premium value for a business.

At S230, the system may transmit an indication of the automatically calculated potential value directly from the back-end application computer server to the front-end user device via the communication network. At S232, the system may also automatically transmit information about the user identifier to a user response terminal, associated with the enterprise, to facilitate communication between the user response terminal and the user. For example, the user's telephone address, email address, etc. might be supplied so that a sales representative can contact the business to discuss the estimated insurance premium in more detail (and potentially complete the sale of the insurance policy). Other information that might be automatically transmitted to the user response terminal might include, for example, an IP address, a user name, a selected description, an assigned category, at least some of the complete set of request details, and/or the automatically calculated potential value. According to some embodiments, the system calculates a "priority score" for each request and transmits that information to the user response terminal (e.g., indicating which users should be contacted first based on the information received from the user, business goals, etc.).

Figure 3A:
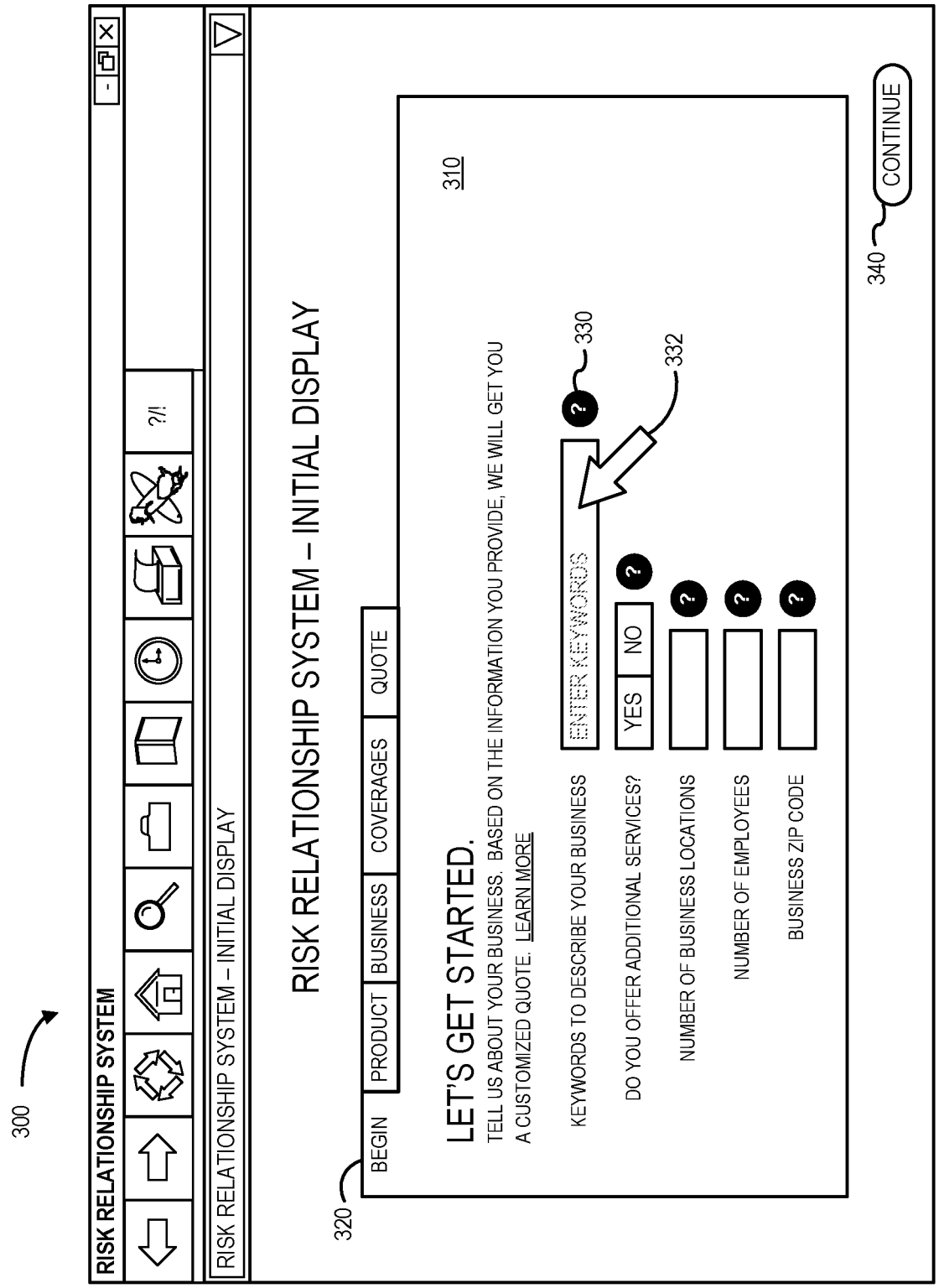
FIG. 3A is an initial risk relationship display in accordance with some embodiments.
Figure 3B:
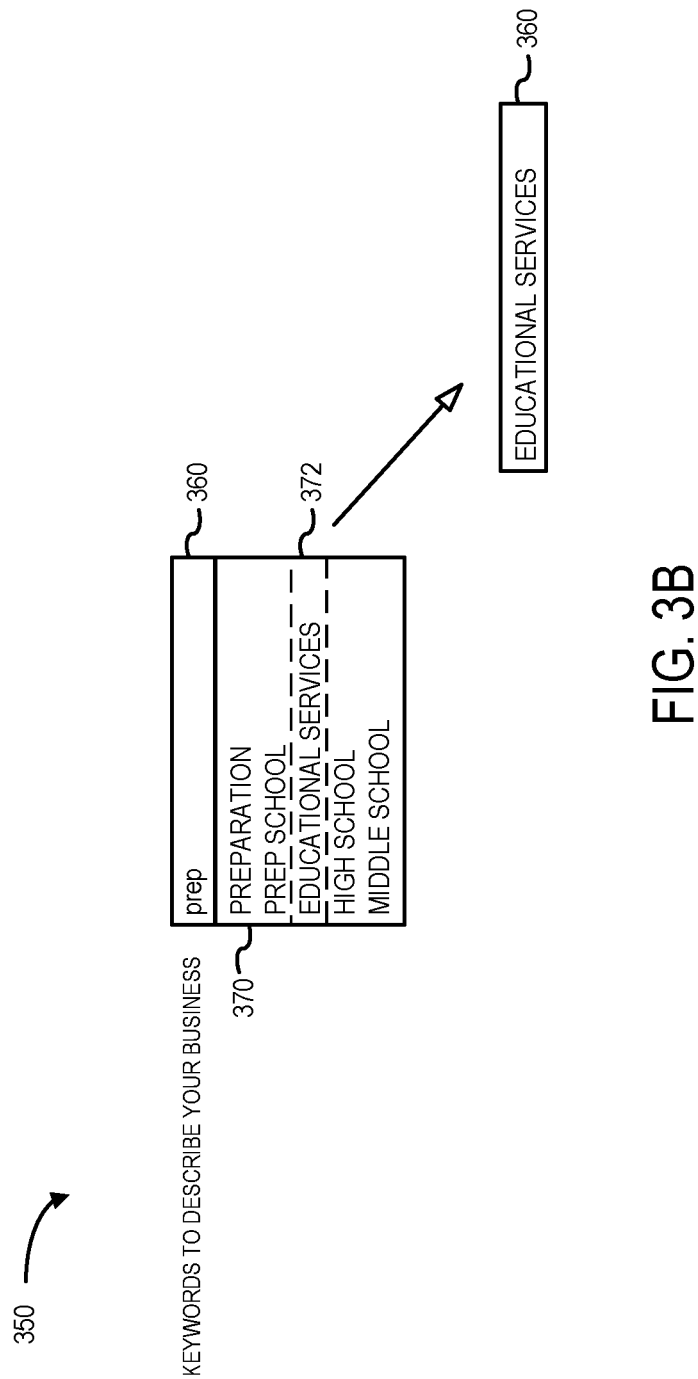
FIG. 3B illustrates a look-up process in accordance with some embodiments

FIG. 3A is an initial risk relationship display 300 in accordance with some embodiments. The display 300 might be, for example, the first interaction between a business seeking insurance and an insurer. The display 300 includes an information input area 310 associated with a "Begin" section 320 of the interaction (e.g., with other sections including product, business, coverages, and quote). A user may enter one or more keywords to describe the business. According to some embodiments, entry of the keywords (or portions of keywords) will result in an automatic look-process being performed. For example, FIG. 3B illustrates a look-up process 350 in accordance with some embodiments. When the user enters text into the keyword field 360 information from a description database (e.g., including keywords, hidden terms, industry codes, etc.) may be used to automatically populate a list 370 representing a set of potential pre-determined descriptions. The use of hidden descriptive terms (e.g., nicknames, alternate titles, synonyms, etc.) that are stored in the description data store and may be used to suggest terms—even when not themselves entered by the user—may provide for an all-inclusive search ability that helps the user locate correct terms to describe his or her business. According to some embodiments, weighted values are used to display the most likely terms at the top of the list 370. The user may then highlight 372 one of the entries in the list and select that entry as the selected description 360 for the business. Referring again to FIG. 3A, according to some embodiments the user can select a "?" icon 330 (e.g., via a computer pointer 332) to receive more information about an input field. Selection of a "Continue" icon 340 might result in presentation of the next risk relationship display (e.g., an insurance products display).

Figure 4:
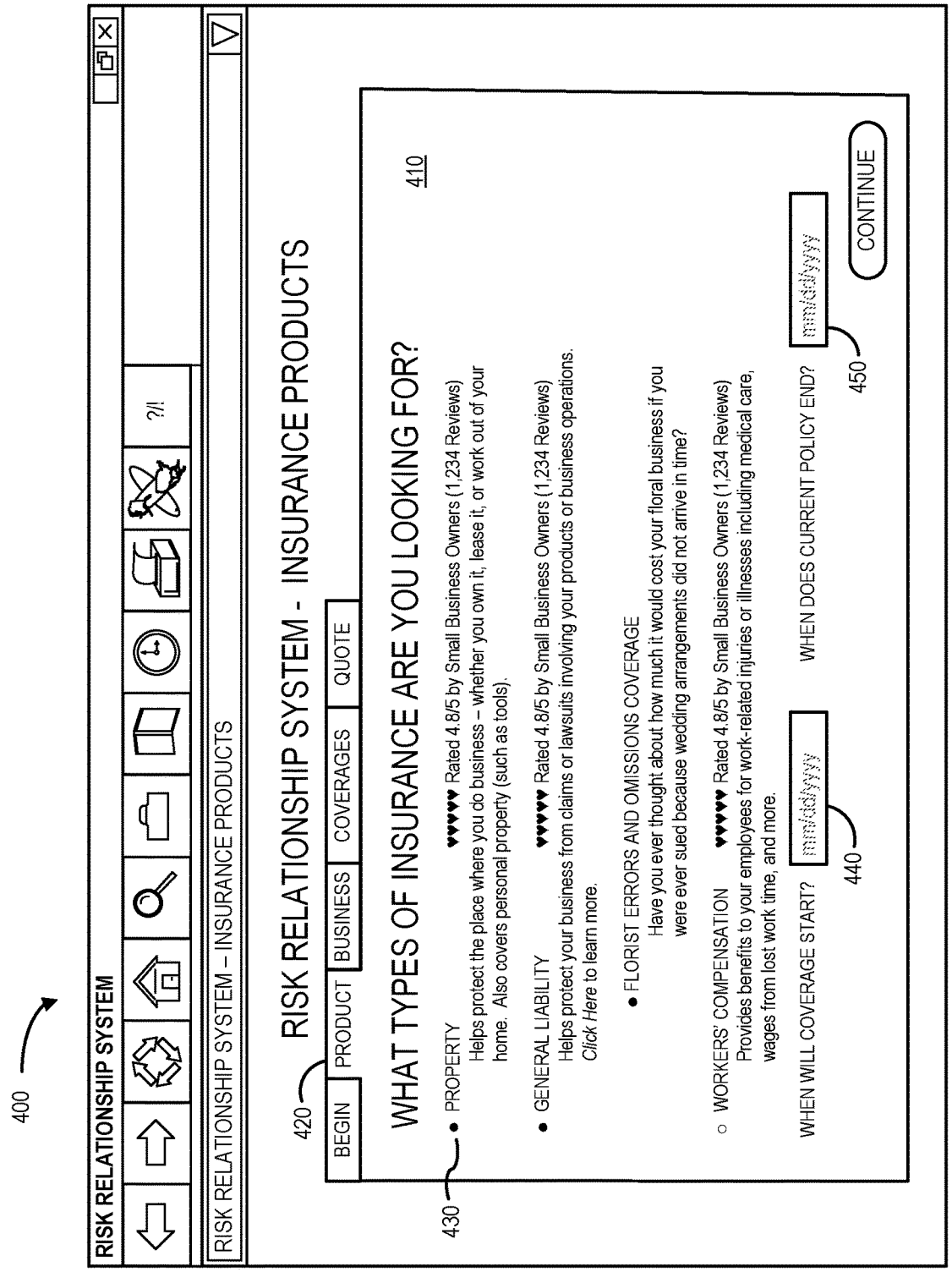
FIG. 4 is an insurance product display according to some embodiments of the present invention.

FIG. 4 is an insurance product display 400 according to some embodiments of the present invention. The display 400 might be, for example, used to indicate what types of insurance products the business is interested in purchasing. The display 400 includes an information input area 410 associated with a "Product" section 420 of the interaction. The display 400 lists each type 430 of insurance product (e.g., property insurance, general liability insurance, florist errors and omissions coverage, and workers' compensation insurance) and might be automatically constructed based on information provided on the initial display 300. According to some embodiments, the user may indicate whether or not the business is interested in each type of insurance (e.g., via a check box, radio button, etc.). The display 400 may also be used to define a time period for the insurance product (e.g., a coverage start date 440 and/or when an existing insurance policy ends 450). Selection of a "Continue" icon might result in presentation of the next display (e.g., an operations details display).

Figure 5:
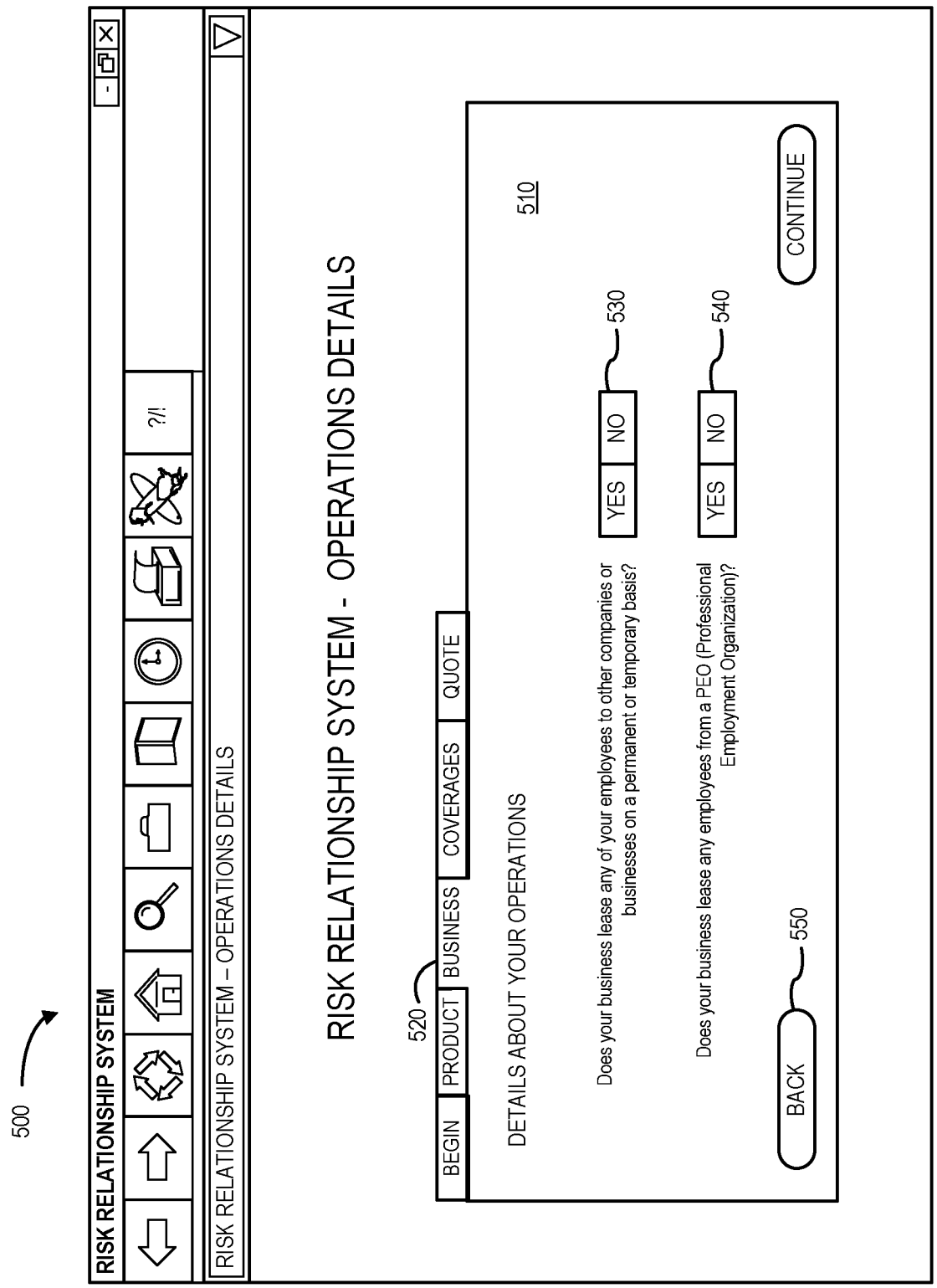
FIG. 5 is an operations details display in accordance with some embodiments.

FIG. 5 is an operations details display 500 in accordance with some embodiments. The display 500 might be, for example, used to enter details about the operation of a business. The display 500 includes an information input area 510 associated with a "Business" section 520 of the interaction. The display 500 includes a "Yes"/"No" selection indicating if the business leases any employees to other companies or business on a permanent or temporary basis 530. Similarly, the display 500 includes a "Yes"/"No" selecting indicating if the business leases any employees from a Professional Employment Organization ("PEO") 540. Selection of a "Back" icon 550 might result in presentation of the previous display (e.g., the insurance product display 400). Selection of a "Continue" icon might result in presentation of the next display (e.g., business information display).

Figure 6:
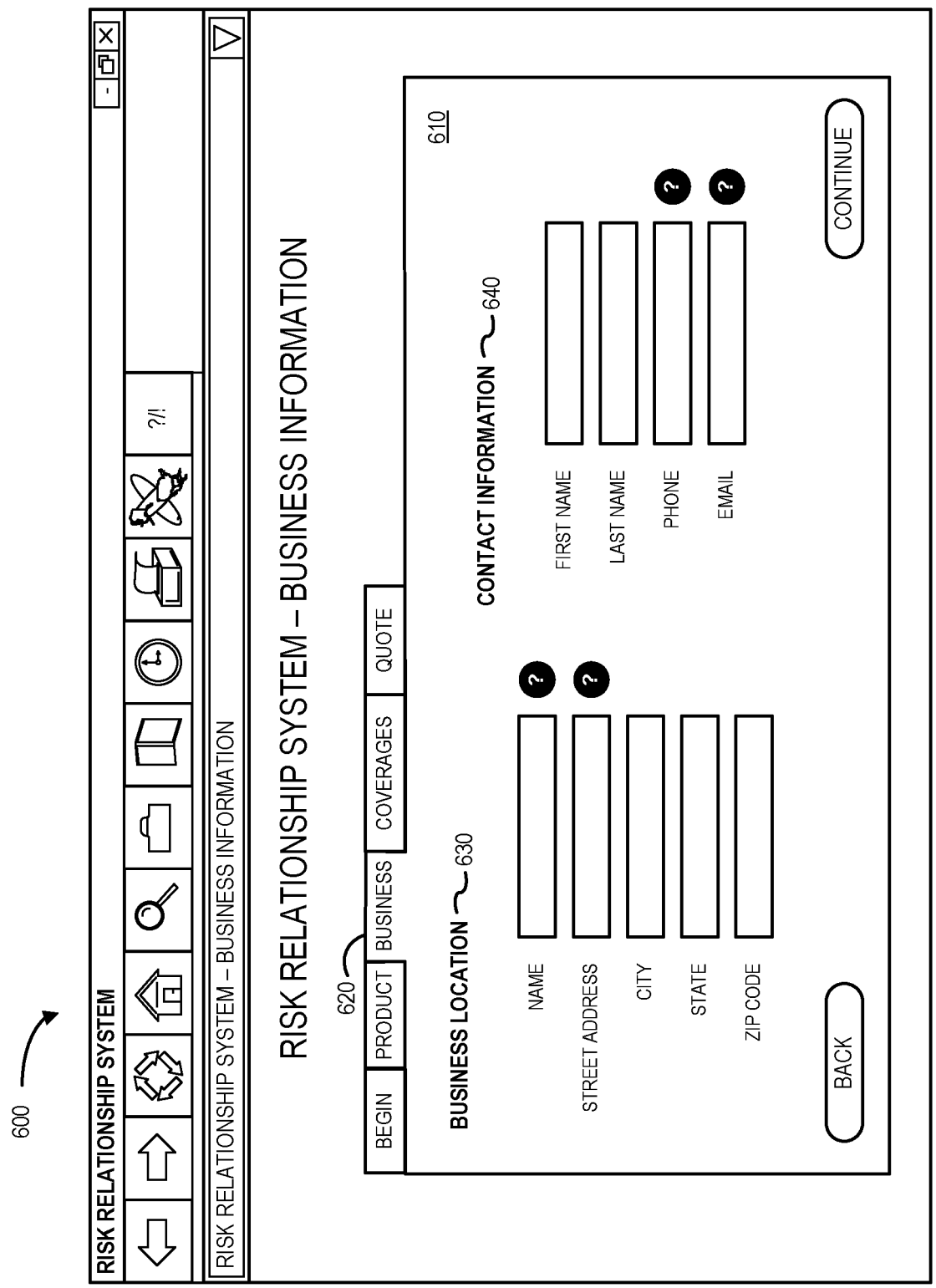
FIG. 6 is a business information display according to some embodiments of the present invention.

FIG. 6 is a business information display 600 according to some embodiments of the present invention. The display 600 might be, for example, used to provide specific information about a particular business. The display 600 includes an information input area 610 associated with a "Business" section 620 of the interaction. The display 600 includes business location input fields 630 (e.g., name, street address, city, state, ZIP code) and contact information input fields 640 (e.g., first name, last name, phone, and email). Selection of a "Continue" icon might result in presentation of the next display (e.g., a business details display).

Figure 7:
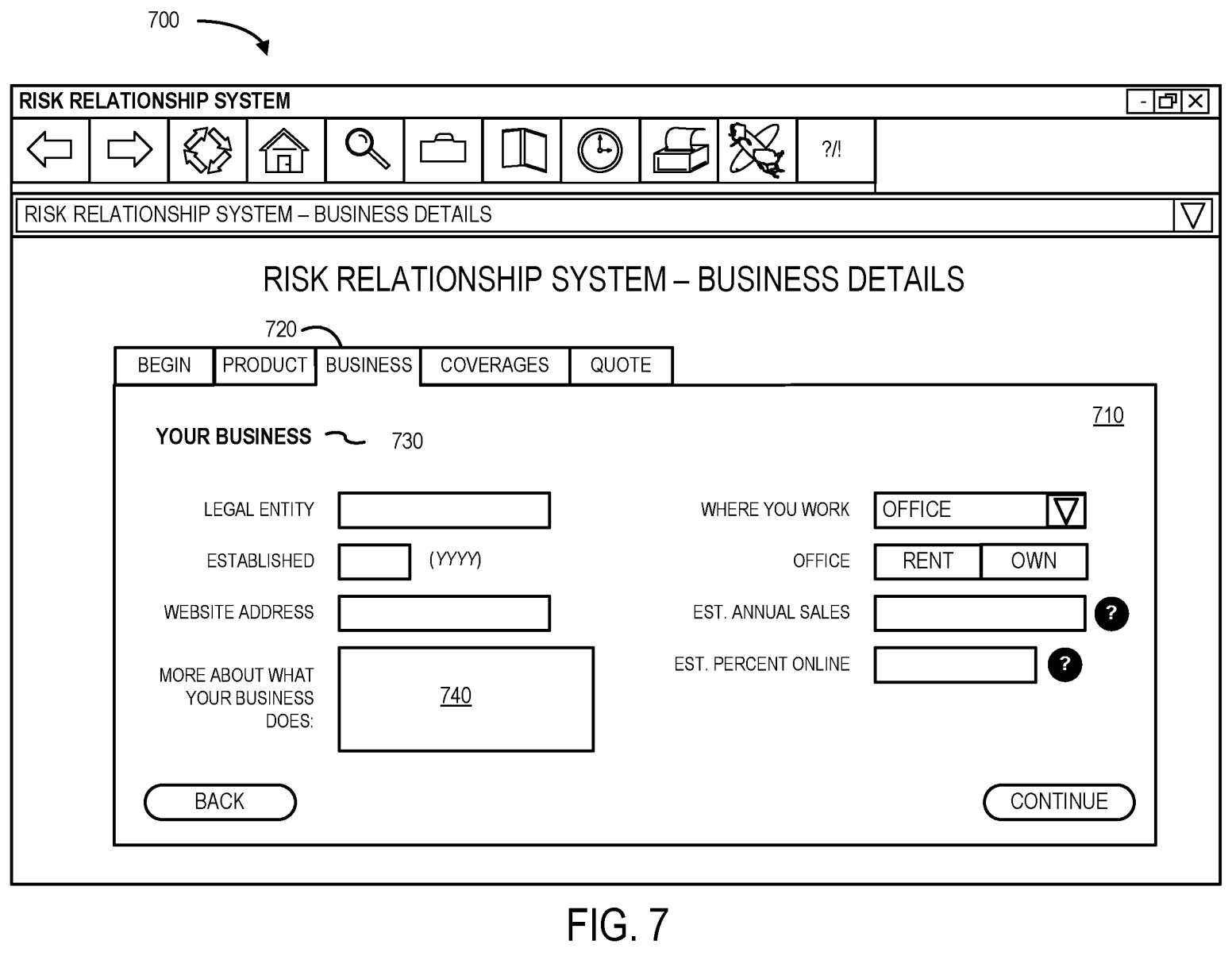

FIG. 7 is a business details display 700 in accordance with some embodiments. The display 700 might be, for example, used to provide more detailed information about the business. The display 700 includes an information input area 710 associated with a "Business" section 720 of the interaction. The more detailed information 730 might include a legal entity type (e.g., corporation, Limited Liability Corporation ("LLC"), etc.), a year established, a website address, a type of office environment (e.g., selected via a drop-down menu), a "Rent"/"Own" office selection, an estimated annual sales value, and an estimated portion of sales that are completed online. The display 700 also includes a text entry box 740 where a user can share any other information about the business that might be relevant. Selection of a "Continue" icon might result in presentation of the next display (e.g., an insurance coverage display).

Figure 8:
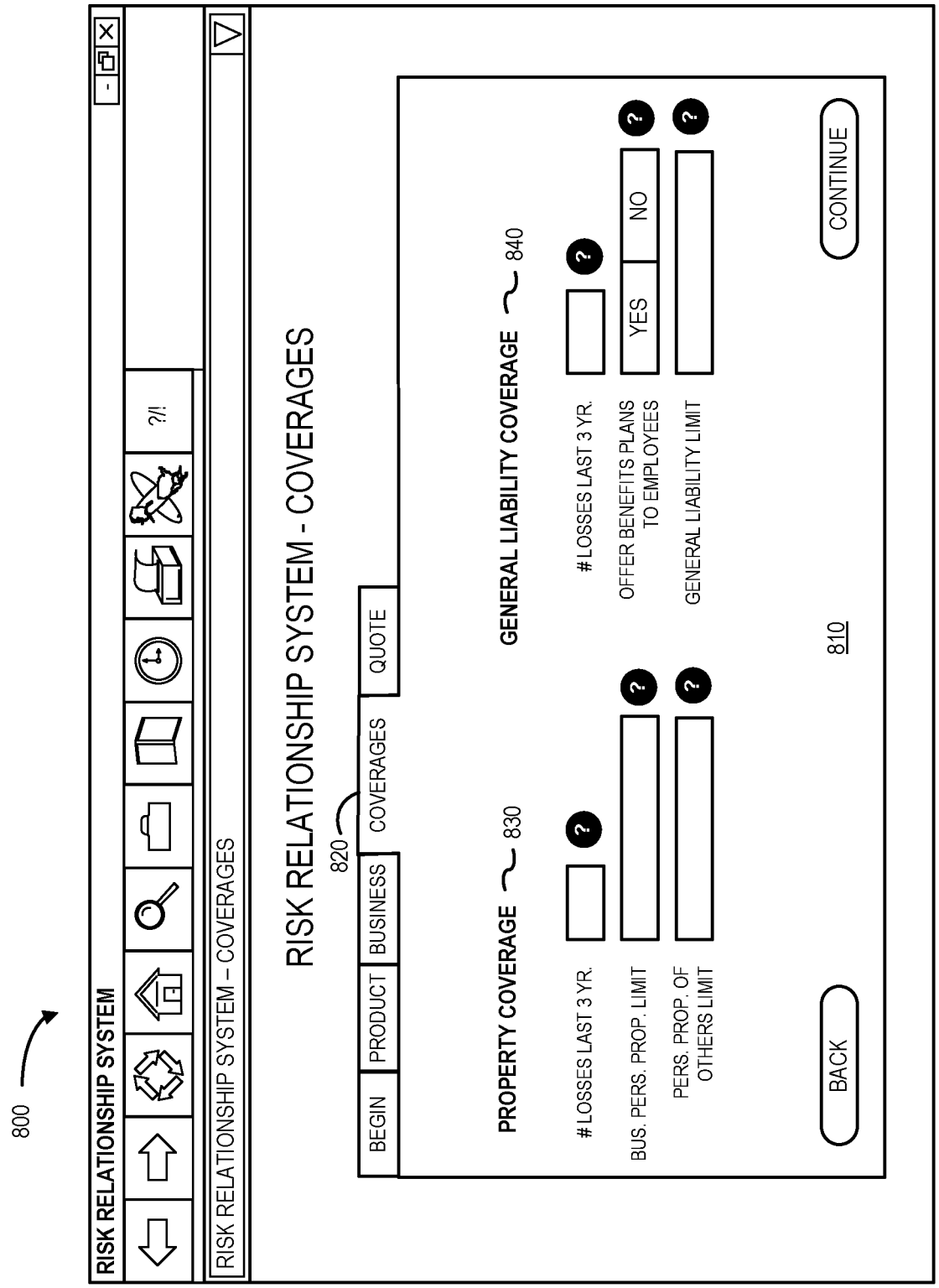
FIG. 8 is an insurance coverage display according to some embodiments of the present invention.

FIG. 8 is an insurance coverage display 800 according to some embodiments of the present invention. The display 800 might be, for example, used to enter coverage limits for an insurance policy. The display 800 includes an information input area 810 associated with a "Coverages" section 820 of the interaction. The display 800 includes property coverage fields 830 (e.g., a number of losses during the last three years, a business personal property limit, a personal property limit of others) and general liability coverage fields 840 (e.g., a number of losses during the last three years, a "Yes"/"No" indication as to whether benefits are offered to employees (e.g., a 401(k) plan), a general liability limit). Selection of a "Continue" icon might result in presentation of the next display (e.g., building information display).

Figure 9A:
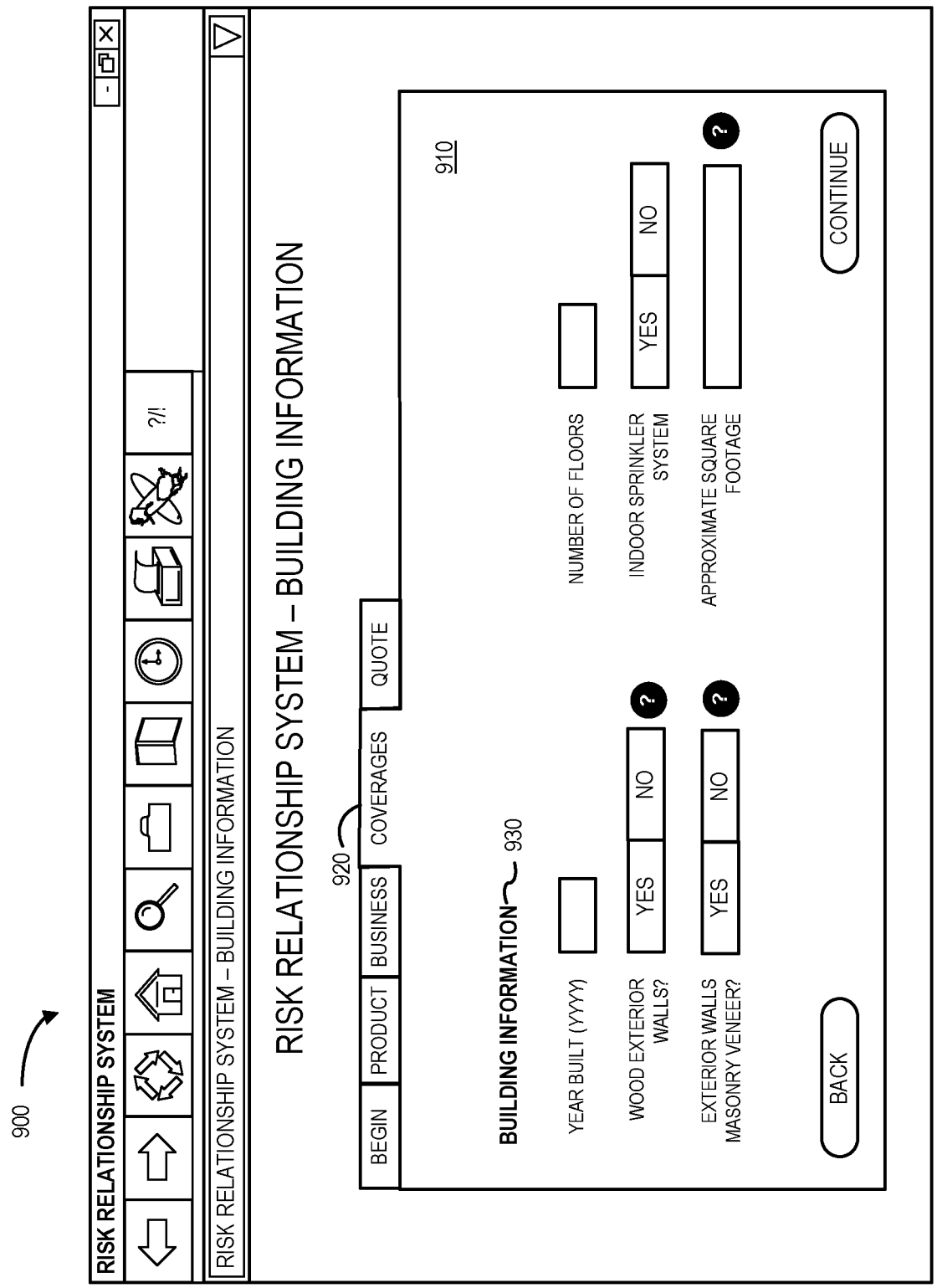
FIG. 9A is a building information display in accordance with some embodiments.
Figure 9B:
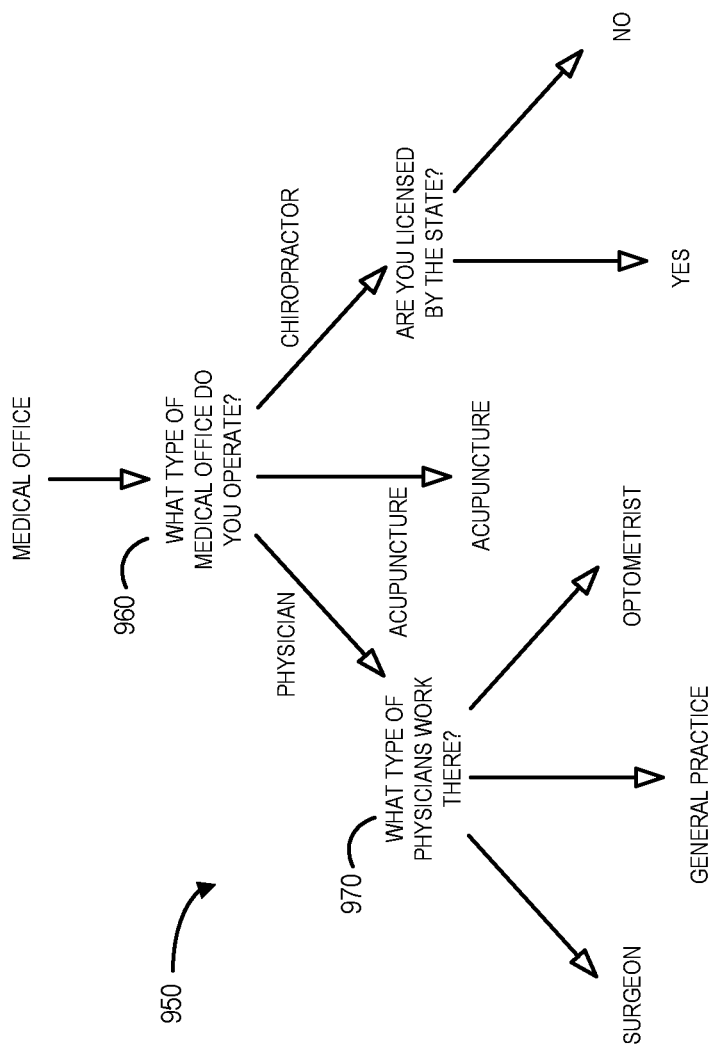
FIG. 9B illustrates a question tree in accordance with some embodiments.

FIG. 9A is a building information display 900 in accordance with some embodiments. The display 900 might be, for example, used to interact with a question tree to appropriate categorize a business. The display 900 includes an information input area 910 associated with a "Coverages" section 920 of the interaction. The display 900 has building information input fields 930 (e.g., associated with a fire safety category) including year built, a "Yes"/"No" wood exterior walls indication, a "Yes"/"No" exterior walls masonry veneer indication, a number of floors, a "Yes"/"No" indoor sprinkler system indication, and an approximate square footage. According to some embodiments, the questions presented via the display are dynamically selected and/or adjusted based on the answers that are provided (e.g., in accordance with information stored in a categorization data store). For example, FIG. 9B illustrates a question tree 950 in accordance with some embodiments. When it is determined that a business is a "Medical Office," a first question is displayed 960 (e.g., "What type of Medical Office do you operate?"). If a user answers "Physician" to that first question 960, one type of second question 970 will be presented to the user (e.g., "What type of Physicians work there?"). If the user instead answers "Chiropractor" to that first question 960, a different type of second question 970 is instead presented to the user (e.g., "Are you licensed by the state?"). Referring again to FIG. 9A, selection of a "Continue" icon might result in presentation of the next display (e.g., a workers' compensation coverage display).

Figure 10:
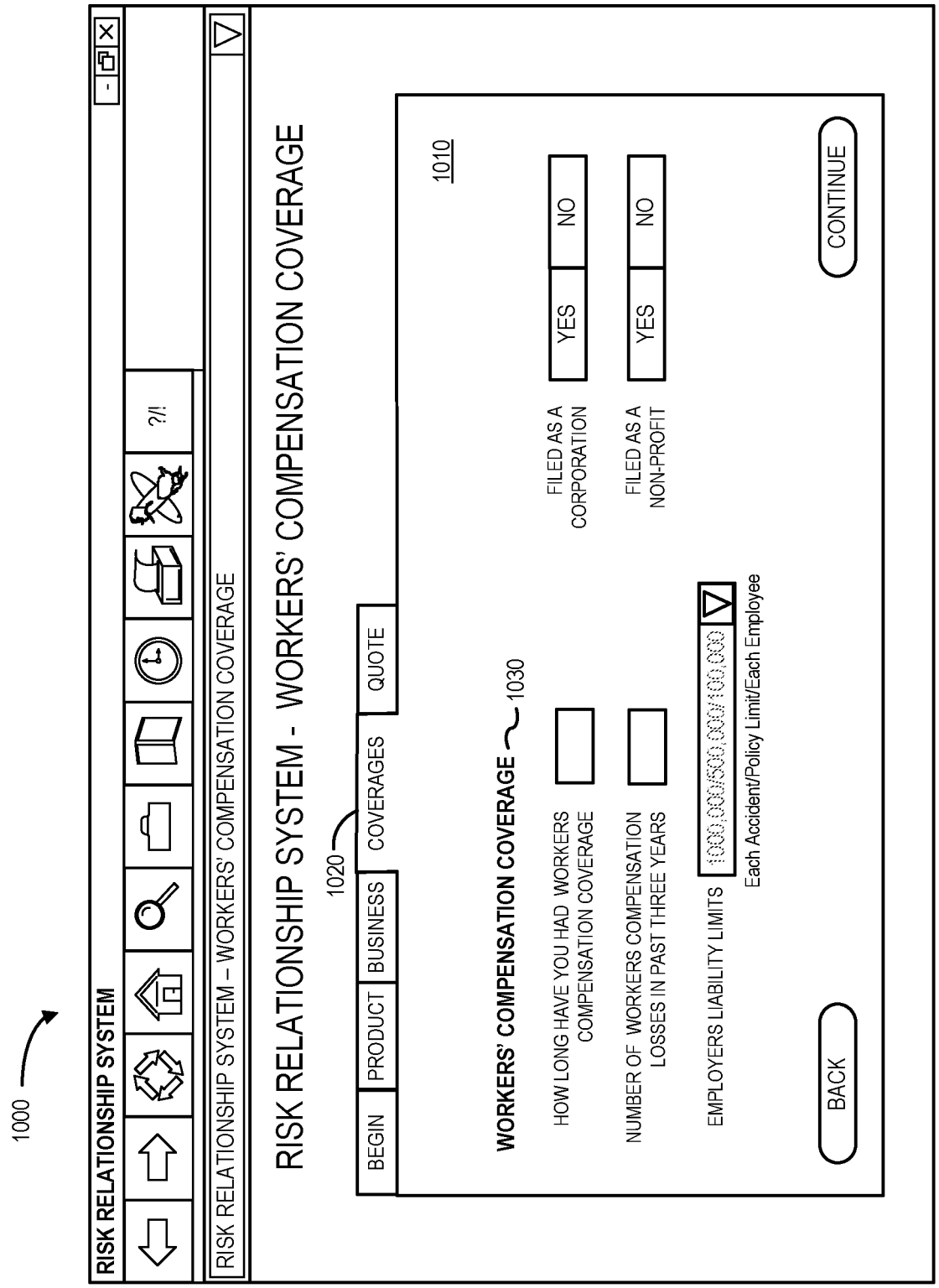
FIG. 10 is a workers' compensation coverage display according to some embodiments of the present invention.

FIG. 10 is a workers' compensation coverage display 1000 according to some embodiments of the present invention. The display 1000 might be, for example, used to enter data relevant to workers' compensation insurance. The display 1000 includes an information input area 1010 associated with a "Coverages" section 1020 of the interaction. The display includes workers' compensation coverage input fields 1030, including how long the business has had workers' compensation coverage, a number of losses during the last three years, employer liability limits, a "Yes"/"No" corporation indication, and a "Yes"/"No" non-profit indication. Selection of a "Continue" icon might result in presentation of the next display (e.g., an insurance premium quote display).

Figure 12:
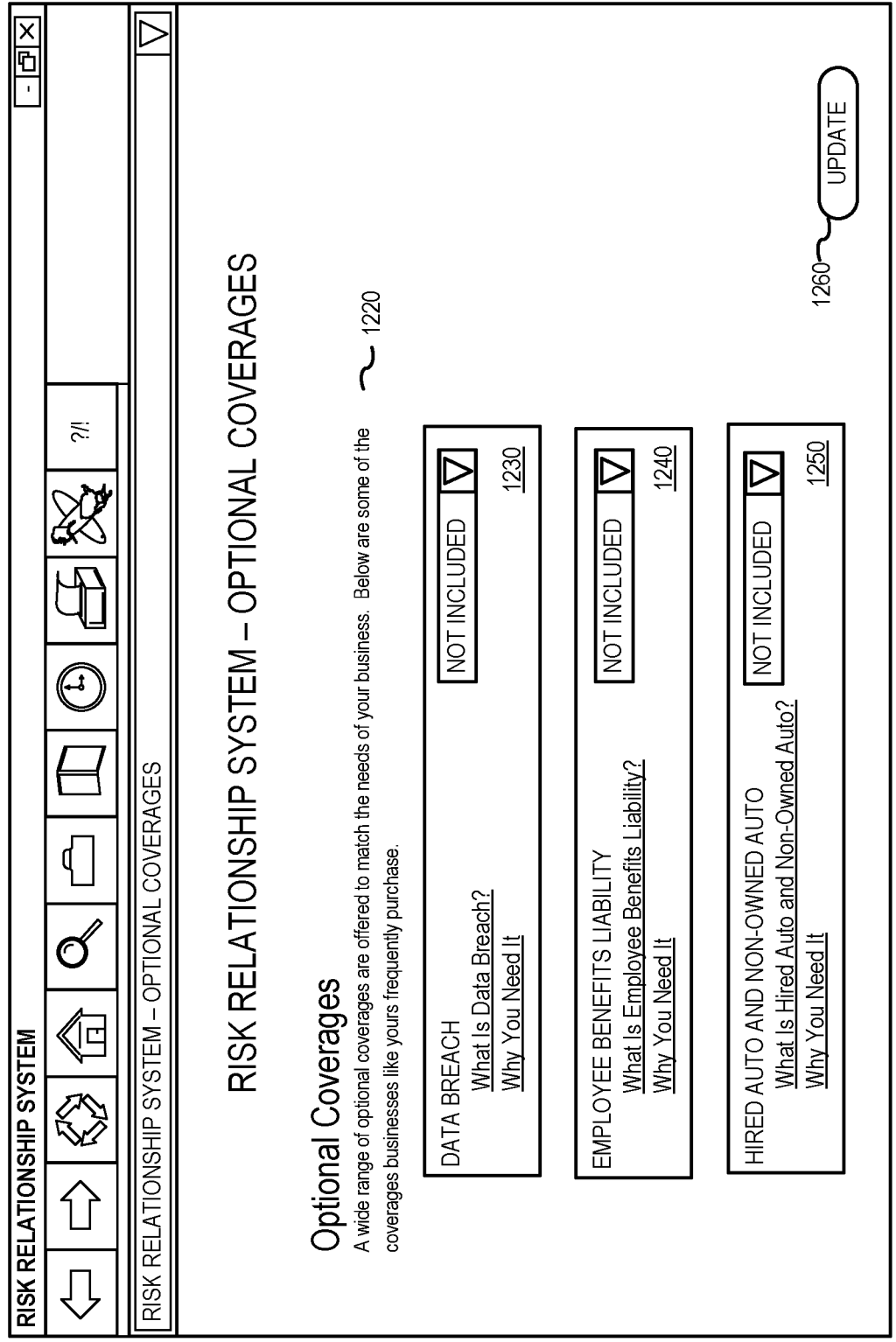
FIG. 12 is an optional insurance coverage display in accordance with some embodiments.
Figure 13:
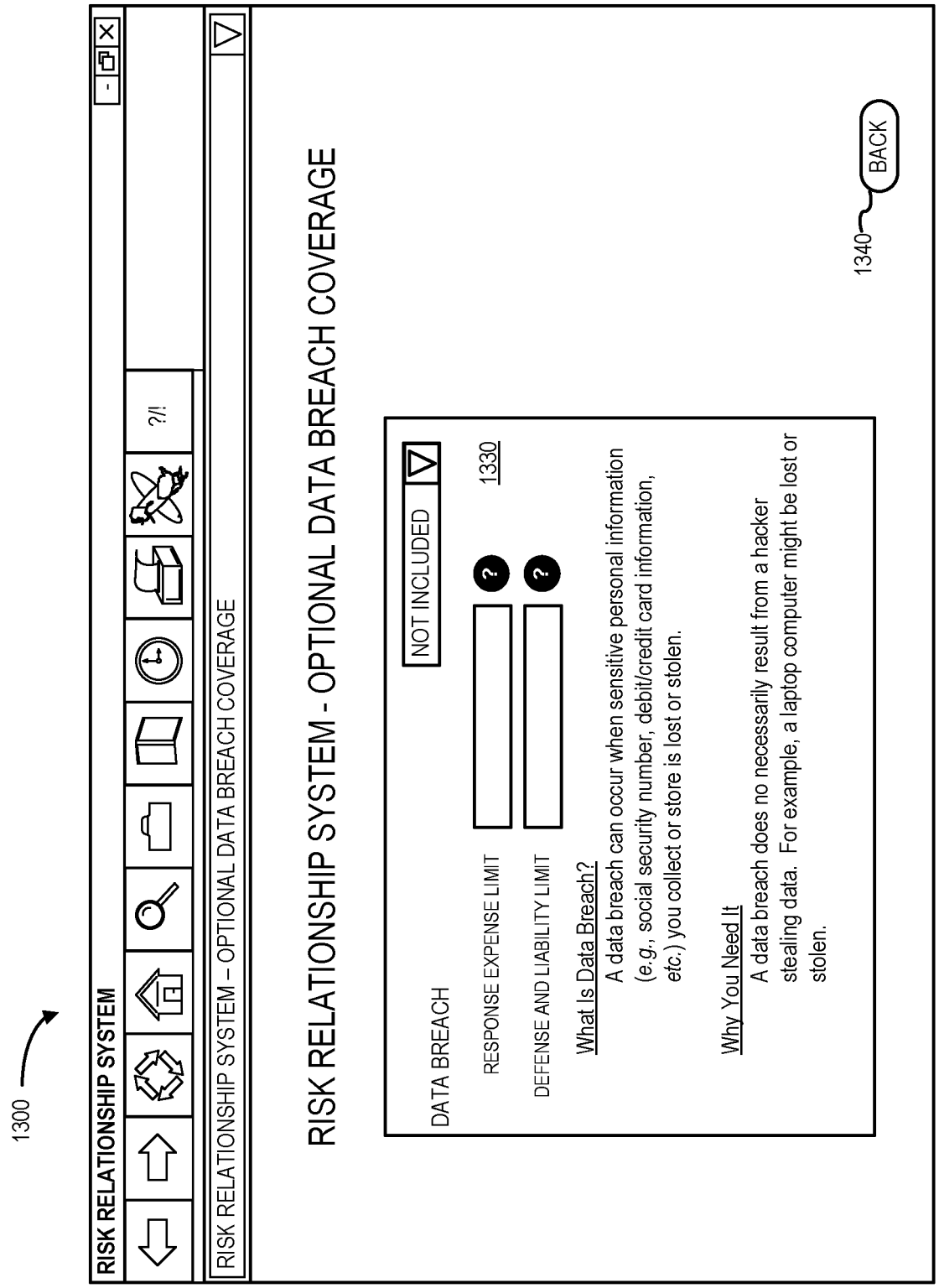
FIG. 13 is an optional data breach coverage display according to some embodiments of the present invention.

FIG. 11 is an insurance premium quote display 1100 in accordance with some embodiments. The display 1100 includes a combined personalized quote incorporating both a property and liability insurance policy premium 1120 and a workers' compensation insurance policy premium 1130. According to some embodiments, selection of a "Request a call from a sales representative" icon 1110 will trigger a communication from a user response terminal (e.g., to discuss the personalized quote in more detail). A property highlights section 1140, a liability highlights section 1150, and a workers' compensation highlights section 1160 provide further details about the quote (e.g., coverage limit details). Selection of an "Add or modify optional coverages" icon 1170 may result in the presentation of an optional insurance coverage display 1200 as illustrated in FIG. 12. In particular, the display might describe optional coverages in general 1220 along with a list of available optional coverages including data breach 1230, employee benefits liability 1240, and hired auto and non-owned auto coverage 1250. Selection of an "Update" icon 1260 might cause the system to re-calculate the estimated insurance premium displayed on the insurance premium quote display 1100. Selection of one of the optional coverages 1230, 1240, 1250 might result in more details being displayed as illustrated by the data breach coverage display 1300 of FIG. 13. This display 1300 includes details 1330 including a response expense limit input field, a defense and liability limit input field, and a more detailed explanation of data breach insurance. Selection of a "Back" icon 1340 might result in presentation of the prior display (e.g., the optional insurance coverage display 1200).

Figure 14:
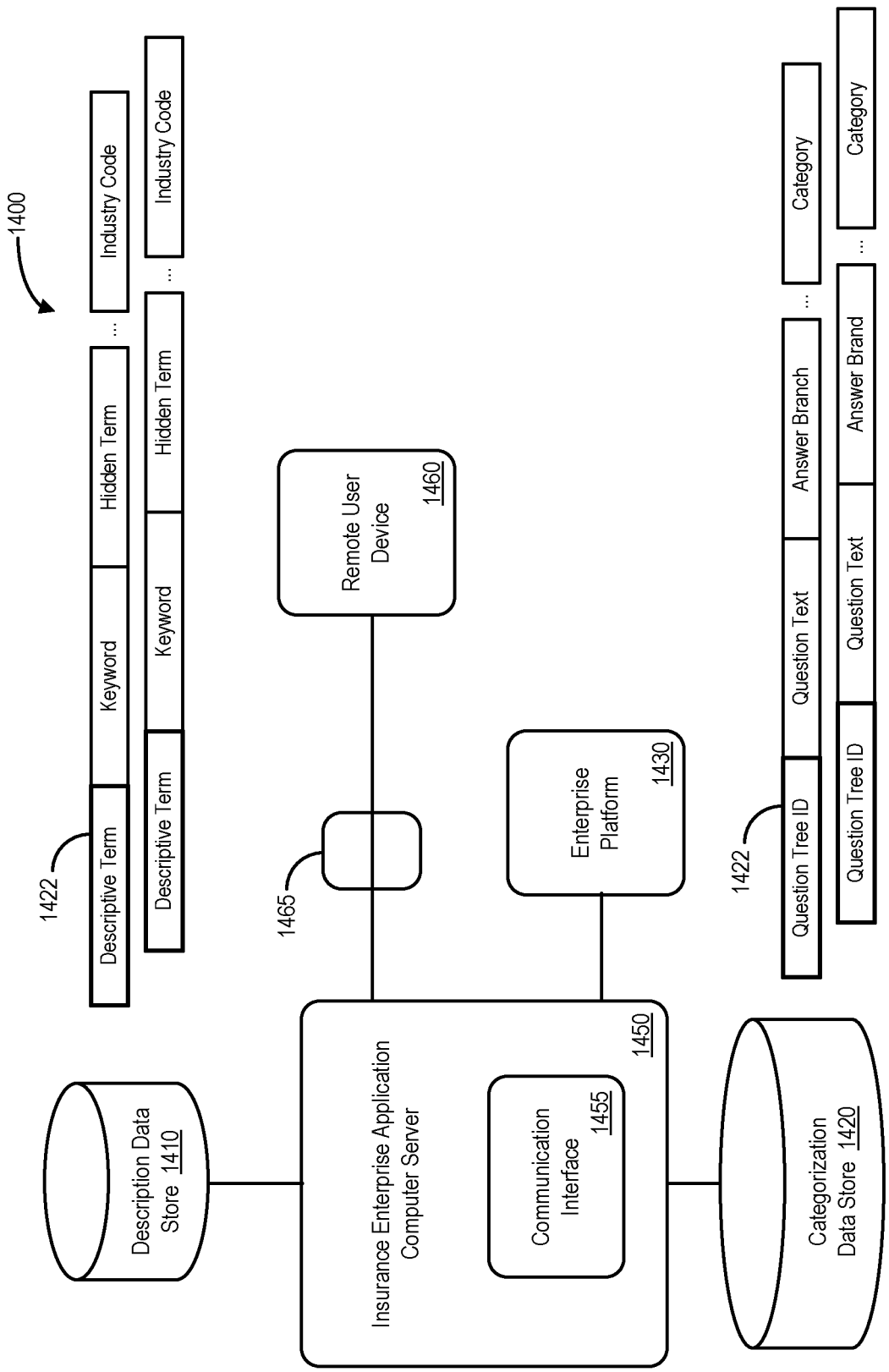
FIG. 14 is a more detailed view of an insurance enterprise system according to some embodiments.

FIG. 14 is a more detailed view of an insurance enterprise system 1400 according to some embodiments. The system 1400 includes an insurance enterprise application computer server 1450 that may access information in a description data store 1410 (e.g., storing a set of electronic records including descriptive terms, keywords, hidden terms, industry codes, etc.). The insurance enterprise application computer server 1450 may also exchange information with remote user devices 1460 (e.g., via a firewall 1465). According to some embodiments, a communication interface 1455 of the insurance enterprise application computer server 1450 may communicate with the user devices 1460 and access information in the description data store 1410.

The insurance enterprise application computer server 1450 might be, for example, associated with a PC, laptop computer, smartphone, an enterprise server, a server farm, and/or a database or similar storage devices. The insurance enterprise application computer server 1450 may store information into and/or retrieve information from the description data store 1410 and/or a categorization data store 1420. The categorization data store 1420 might, for example, store electronic records 1422 including a question tree identifier, question text, answer branches, categories, etc. The description data store 1410 and categorization data store 1420 may contain data that was downloaded and/or that was originally input via employees of the insurer. According to some embodiments, an enterprise platform 1430 may also provide information to the insurance enterprise application server 1450 (e.g., to provide underwriting information associated with an estimated insurance premium). The enterprise platform 1430 might exchange information via a Real Time Services ("RTS") process that exchanges information via XML.

Figure 15:
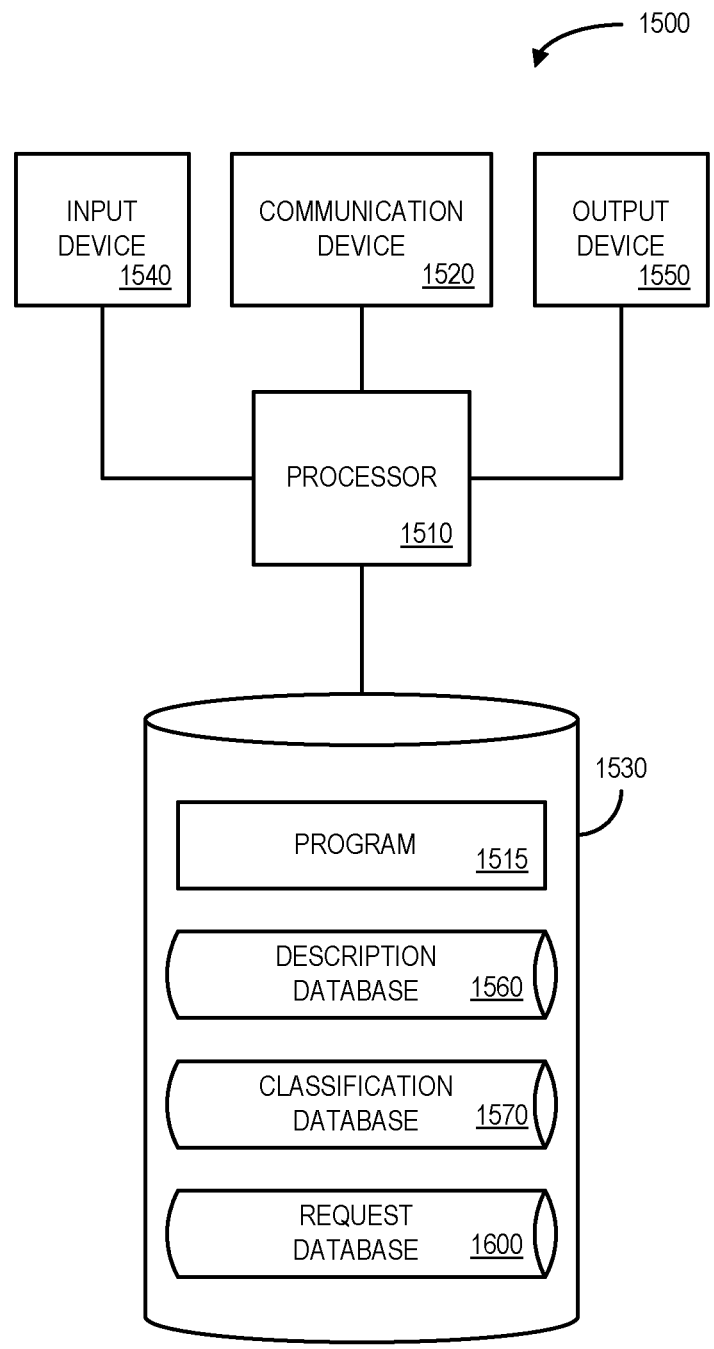
FIG. 15 is a block diagram of an apparatus in accordance with some embodiments of the present invention.

Embodiments described herein may comprise a tool to receive information directly from users and may be implemented using any number of different hardware configurations. For example, FIG. 15 illustrates a back-end application computer server 1500 that may be, for example, associated with the systems 100, 1400 of FIGS. 1 and 14, respectively. The back-end application computer server 1500 comprises a processor 1510, such as one or more commercially available Central Processing Units ("CPUs") in the form of one-chip microprocessors, coupled to a communication device 1520 configured to communicate via a communication network (not shown in FIG. 15). The communication device 1520 may be used to communicate, for example, with one or more remote front-end user devices (e.g., PCs and smartphones), third-party devices, enterprise platforms, user response terminals, etc. Note that communications exchanged via the communication device 1520 may utilize security features, such as those between a public internet user and an internal network of an insurance enterprise. The security features might be associated with, for example, web servers, firewalls, and/or PCI infrastructure. The back-end application computer server 1500 further includes an input device 1540 (e.g., a mouse and/or keyboard to enter information about descriptive terms, keywords, question trees, etc.) and an output device 1550 (e.g., to system administration messages, generate reports, etc.).

The processor 1510 also communicates with a storage device 1530. The storage device 1530 may comprise any appropriate information storage device, including combinations of magnetic storage devices (e.g., a hard disk drive), optical storage devices, mobile telephones, and/or semiconductor memory devices. The storage device 1530 stores a program 1515 and/or an interface application for controlling the processor 1510. The processor 1510 performs instructions of the program 1515, and thereby operates in accordance with any of the embodiments described herein. For example, the processor 1510 may receive a potential risk relationship request along with a descriptive term. A look-up process may be performed by the processor 1510 based on the descriptive term (and hidden terms) may establish a set of potential pre-determined descriptions. The user may select one of the potential descriptions, and a user identifier may be associated with the request. A series of dynamic information exchanges may then help assign a category to the user identifier. A partial set of initial request details may be received by the processor 1510 from a third-party device and the user may adjust and/or add details to create a complete set. A potential value may then be automatically calculated by the processor 1510 for the potential risk relationship. An indication of the potential value may be transmitted to the user, and information about the user identifier may be transmitted to a user response terminal to facilitate communication between the user response terminal and the user.

The program 1515 may be stored in a compressed, uncompiled and/or encrypted format. The program 1515 may furthermore include other program elements, such as an operating system, a database management system, and/or device drivers used by the processor 1510 to interface with peripheral devices.

As used herein, information may be "received" by or "transmitted" to, for example: (i) the back-end application computer server 1500 from another device; or (ii) a software application or module within the back-end application computer server 1500 from another software application, module, or any other source.

In some embodiments (such as shown in FIG. 15), the storage device 1530 further stores a description database 1560, a classification database 1570, and request database 1600. An example of a database that might be used in connection with the back-end application computer server 1500 will now be described in detail with respect to FIG. 16. Note that the database described herein is only an example, and additional and/or different information may be stored therein. Moreover, various databases might be split or combined in accordance with any of the embodiments described herein. For example, the request database 1600 and/or description database 1560 might be combined and/or linked to each other within the program 1515.

Figure 16:
FIG. 16 is a portion of a request database in accordance with some embodiments.

Referring to FIG. 16, a table is shown that represents the request database 1600 that may be stored at the back-end application computer server 1500 according to some embodiments. The table may include, for example, entries identifying potential risk relationship requests received by an enterprise from users. The table may also define fields 1602, 1604, 1606, 1608, 1610, 1612, 1614 for each of the entries. The fields 1602, 1604, 1606, 1608, 1610, 1612, 1614 may, according to some embodiments, specify: a potential relationship request identifier 1602, a user identifier 1604, potential pre-determined descriptions 1606, a selected description 1608, an assigned category 1610, a calculated potential value 1612, and a user response terminal identifier 1614. The request database 1600 may be created and updated, for example, based on information electrically received from remote front-end user devices.

The potential relationship request identifier 1602 may be, for example, a unique alphanumeric code identifying a user who is asking for a personalized insurance premium quote (e.g., "RR 101"). The user identifier 1604 might be, for example, a user name, email address, telephone number, etc. that can be used to identify the request. The potential pre-determined description 1606 is a set of terms that might describe the business (e.g., and might be generated by a look-up process as described with respect to FIG. 3B). The selected description 1608 indicates which of the potential pre-determined descriptions 1606 was selected by the user as best describing the business. The assigned category 1610 might be determined, for example, via an interactive question tree as described with respect to FIG. 9B. The calculated potential value 1612 may represent a personalized insurance quote for the user. The user response terminal identifier 1614 might be associated with, for example, a customer service representative who can contact the user to provide or receive more information about the request.

Thus, embodiments may facilitate an exchange of risk relationship information directly between a user and an enterprise in an automated, efficient, and accurate manner. This may help streamline communications, reduce the number of messages that need to be exchanged, reduce errors, etc.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 17:
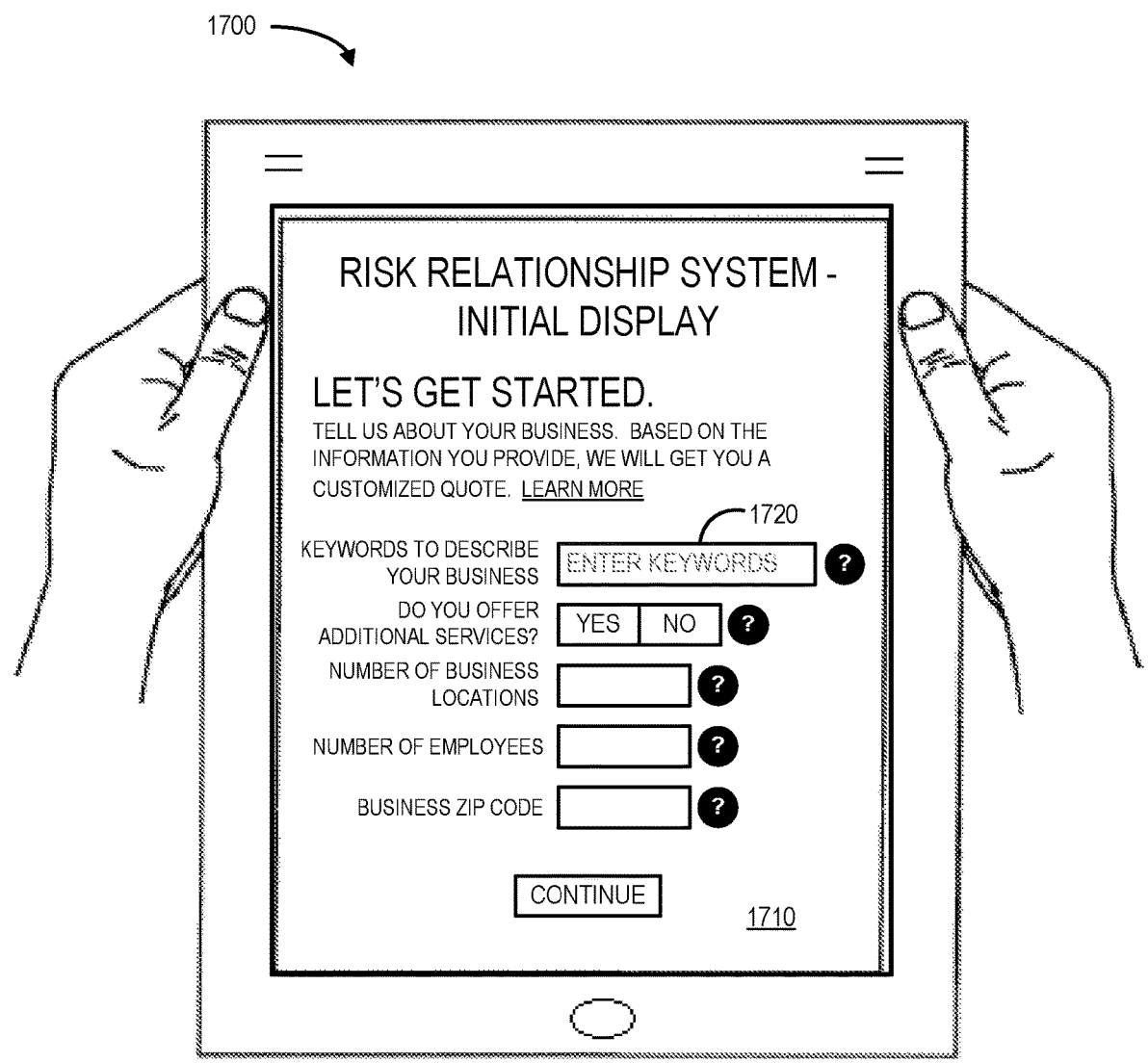
FIG. 17 illustrates a handheld tablet device displaying an initial display according to some embodiments.

Although specific hardware and data configurations have been described herein, note that any number of other configurations may be provided in accordance with embodiments of the present invention (e.g., some of the information associated with the displays described herein might be implemented as a virtual or augmented reality display and/or any of the embodiments might be implemented using a cloud based computing platform). Moreover, although embodiments have been described with respect to particular types of insurance policies, embodiments may instead be associated with other types of insurance. Still further, the displays and devices illustrated herein are only provided as examples, and embodiments may be associated with any other types of user interfaces. For example, FIG. 17 illustrates a handheld touchscreen tablet computer 1700 with an initial display 1710 according to some embodiments. In particular, the display 1710 includes selection areas 1720 that let a user provide information directly to an insurer, including keywords, business details, etc. According to some embodiments, a display may let a user chat with a representative of an enterprise (e.g., a text-based chat or a video chat) and/or arrange to provide a payment to the enterprise (e.g., to provide payment of an insurance premium via a credit card or other payment option).

Figure 18:
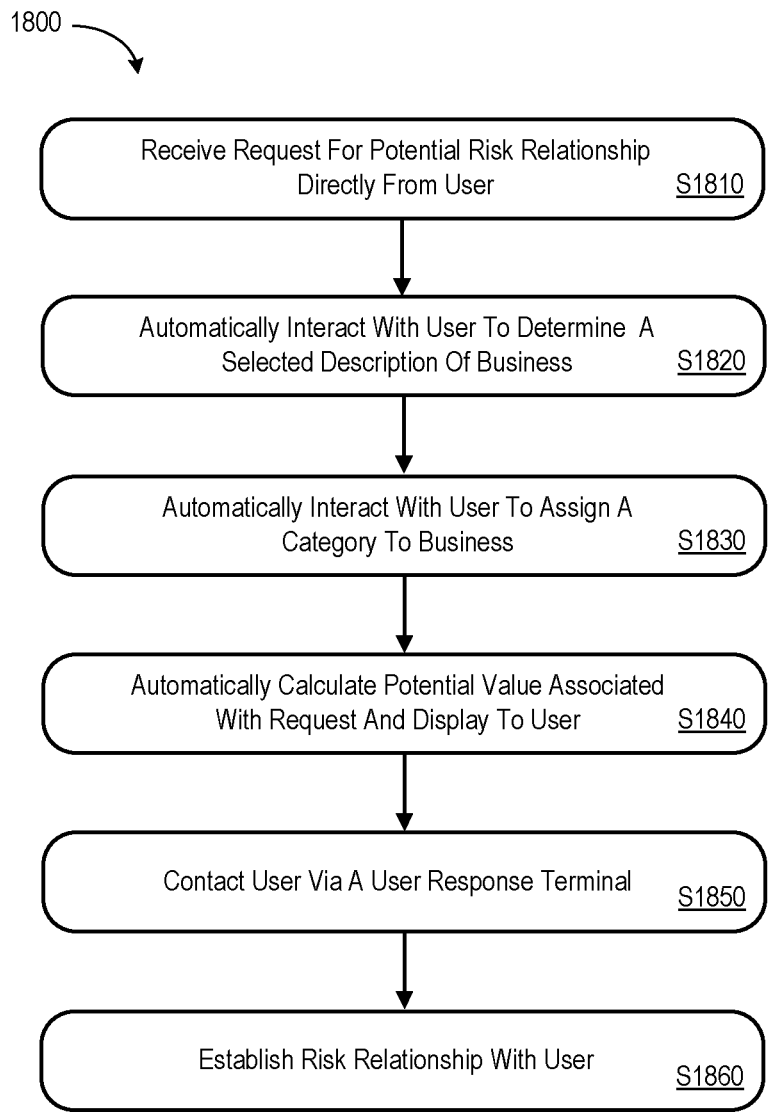
FIG. 18 illustrates an overall insurance enterprise workflow in accordance with some embodiments.

Note that embodiments described herein might be used in connection with a number of different types of business process flows. For example, FIG. 18 illustrates an overall process 1800 that might be associated with an insurance enterprise in accordance with some embodiments. At S1810, an enterprise may receive a request about a potential risk relationship directly from a user. At S1820, the system may automatically interact with the user to determine a selected description of a business (e.g., as described with respect to FIG. 3B). At S1830, the system may automatically interact with the user to assign an appropriate category to the business (e.g., as described with respect to FIG. 9B). At S1840, the system may automatically calculate a potential value associated with the request (e.g., a personalized estimated insurance premium quote). At S1850, the user may be contacted via a user response terminal. For example, a sales representative might place a telephone call to the user. At S1860, a risk relationship may be established between the user and the enterprise (e.g., an insurance policy may be sold to the business).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A method of facilitating a data exchange between a user and an automated back-end application computer server via an interactive user interface display, the method comprising:
   receiving directly from a web browser of a front-end user device a signal indicating a request,
   dynamically modifying an amount of information displayed on a font or a page layout of the interactive user interface display based on a type of the front-end user device, wherein the type is one of a personal computer, a tablet computer, a smartphone, a television device, a gaming device and a smartwatch information displayed on the interactive user interface display is presented based on a type of device,
   receiving, via a descriptive term input element displayed on an interactive user interface display of a first of a plurality of web pages for which data is contained in a computer store, at least one descriptive term from the front-end user device, performing a look-up process based on the at least one descriptive term to establish a set of potential pre-determined descriptions, wherein the look-up process associates hidden descriptive terms with at least some of the potential pre-determined descriptions based on electronic records in a description data store, wherein the hidden descriptive terms include at least one of nicknames, alternate titles, and synonyms, associating a user identifier with the request, automatically assigning, via a dynamic information exchange element included in a second of the plurality of web pages, one of a number of pre-determined categories as being associated with the user identifier, pre-populating information fields in the interactive user interface display by using a partial set of initial request details received from a third-party device, receiving, from the front-end user device, adjustments to the partial set of initial request details along with additional initial request details to establish a complete set of request details, automatically calculating a potential value associated with the request wherein the calculation is based on all of: the set of potential pre-determined descriptions, the assigned category, the complete set of request details, and information from an enterprise platform, automatically transmitting information about the user identifier directly to a user response terminal, associated with an enterprise, to facilitate communication between the user response terminal and the user, wherein the information about the user identifier transmitted to the user response terminal includes at least one of: (i) an Internet protocol address, (ii) a selected description, (iii) the assigned category, (iv) at least some of the complete set of request details, and (v) the automatically calculated potential value, and automatically generating and transmitting directly to the web browser a results web page that displays:
 (a) the automatically calculated potential value, and
 (b) a user-selectable icon to establish communication between the front-end user device and the user response terminal.

2. The method of claim 1, wherein the user identifier is associated with a postal address.

3. The method of claim 1, wherein information from the third-party device is further used to validate data received from the user.

4. The method of claim 1, wherein the selected description represents an industry code.

5. The method of claim 1, wherein the assigned category represents building information.

6. The method of claim 1, wherein the complete set of request details includes at least three of: (i) a number of business locations, (ii) a number of employees, (iii) a business ZIP code, (iv) an indication of one or more types of insurance, (v) a time period, (vi) a business location, (vii) contact information, (viii) a legal entity type, (ix) an indication of when a business was established, (x) an office type, (xi) an estimated annual sales or gross revenue value, (xii) an online sales estimate, (xiii) a number of property losses, (xiv) a business personal property limit, (xv) a personal property of others limit, (xvi) a number of liability losses, (xvii) a general liability limit, (xviii) building information, (xix) workers' compensation insurance data, and (xx) optional coverage selections.

7. The method of claim 1, wherein the automatically calculated potential value represents a potential insurance premium value.

8. A non-transitory memory device for storing program instructions to control a processor to facilitate a data exchange between a user and an automated back-end computer server via an interactive user interface display by performing functions as follows:

receiving directly from a web browser of a front-end user device a signal indicating a request, dynamically modifying an amount of information displayed on the interactive user interface display based on a type of the front-end user device, wherein the type is one of a personal computer, a tablet computer, a smartphone, a television device, a gaming device, and a smartwatch, receiving, via a descriptive term input element displayed on an interactive user interface display of a first of a plurality of web pages for which data is contained in a computer store, at least one descriptive term from the front-end user device, performing a look-up process based on the at least one descriptive term to establish a set of potential pre-determined descriptions, wherein the look-up process associates hidden descriptive terms with at least some of the potential pre-determined descriptions based on electronic records in a description data store, wherein the hidden descriptive terms include at least one of nicknames, alternate titles, and synonyms, associating a user identifier with the request, automatically assigning, via a dynamic information exchange element included in a second of the plurality of web pages, one of a number of pre-determined categories as being associated with the user identifier, pre-populating information fields in the interactive user interface display by using a partial set of initial request details received from a third-party device, receiving, from the front-end user device, adjustments to the partial set of initial request details along with additional initial request details to establish a complete set of request details, automatically calculating a potential value associated with the request wherein the calculation is based on all of: the set of potential pre-determined descriptions, the assigned category, the complete set of request details, and information from an enterprise platform, automatically transmitting information about the user identifier directly to a user response terminal, associated with an enterprise, to facilitate communication between the user response terminal and the user, wherein the information about the user identifier transmitted to the user response terminal includes at least one of: (i) an Internet protocol address, (ii) a selected description, (iii) the assigned category, (iv) at least some of the complete set of request details, and (v) the automatically calculated potential value, and automatically generating and transmitting directly to the web browser a results web page that displays:
 (a) the automatically calculated potential value, and
 (b) a user-selectable icon to establish communication between the front-end user device and the user response terminal.

9. The memory device of claim 8, wherein the user identifier is associated with a postal address.

10. The memory device of claim 8, wherein information from the third-party device is further used to validate data received from the user.

11. A non-transitory memory device for storing program instructions to control a processor to facilitate data exchange between a user and an enterprise via an automated back-end application computer server by performing functions as follows:
- receiving, directly from a front-end user device associated with the user, a request,
- dynamically modifying an amount of information displayed on the interactive user interface display based on a type of the front-end user device, wherein the type is one of a personal computer, a tablet computer, a smartphone, a television device, a gaming device, and a smartwatch,
- receiving at least one descriptive term from the front-end user device via an interactive user interface display,
- performing a look-up process based on the at least one descriptive term to establish a set of potential pre-determined descriptions, wherein the look-up process associates hidden descriptive terms with at least some of the potential pre-determined descriptions based on electronic records in a description data store, wherein the hidden descriptive terms include at least one of nicknames, alternate titles, and synonyms,
- associating a user identifier with the request,
- automatically assigning, via a series of dynamic information exchanges retrieved based on electronic data records in a categorization data store, one of a number of pre-determined categories as being associated with the user identifier,
- pre-populating information fields in the interactive user interface display by using a partial set of initial request details received from a third-party device, receiving, from the front-end user device, adjustments to the partial set of initial request details along with additional initial request details to establish a complete set of request details,
- automatically calculating a potential value associated with the request wherein the calculation is based on all of: the set of potential pre-determined descriptions, the assigned category, the complete set of request details, and information from an enterprise platform,
- transmitting an indication of the automatically calculated potential value directly from the back-end application computer server to the front-end user device via a communication network, and
- automatically transmitting information about the user identifier directly to a user response terminal, associated with the enterprise, to facilitate communication between the user response terminal and the user, wherein the information about the user identifier transmitted to the user response terminal includes at least one of: (i) an Internet protocol address, (ii) a selected description, (iii) the assigned category, (iv) at least some of the complete set of request details, and (v) the automatically calculated potential value, and
- automatically generating and transmitting directly to the web browser a results web page that displays:
  - (a) the automatically calculated potential value, and
  - (b) a user-selectable icon to establish communication between the front-end user device and the user response terminal.

12. The memory device of claim 11, wherein the user identifier is associated with a postal address.

13. The memory device of claim 11, wherein information from the third-party device is further used to validate data received from the user.

* * * * *